US006743873B2

(12) United States Patent
Kirk et al.

(10) Patent No.: US 6,743,873 B2
(45) Date of Patent: Jun. 1, 2004

(54) OLEFIN POLYMERIZATION CATALYST COMPOSITION AND PREPARATION THEREOF

(75) Inventors: Thomas Cleveland Kirk, Ivyland, PA (US); Eric Gustave Lundquist, North Wales, PA (US); Timothy Roger Lynn, Glen Gardner, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 24 days.

(21) Appl. No.: 10/431,126

(22) Filed: May 7, 2003

(65) Prior Publication Data

US 2003/0224928 A1 Dec. 4, 2003

Related U.S. Application Data

(60) Provisional application No. 60/383,650, filed on May 28, 2002.

(51) Int. Cl.[7] .................................................. C08F 4/02
(52) U.S. Cl. ........................ 526/204; 526/160; 526/165; 526/172; 526/201; 502/108; 502/109; 502/152; 502/167
(58) Field of Search ................................ 502/108, 109, 502/152, 167; 526/160, 165, 172, 201, 204

(56) References Cited

U.S. PATENT DOCUMENTS

| 4,525,538 | A | | 6/1985 | Baker et al. |
|---|---|---|---|---|
| 4,528,332 | A | | 7/1985 | Ai et al. |
| 4,931,476 | A | * | 6/1990 | Mauz et al. |
| 5,346,925 | A | | 9/1994 | Sugano et al. |
| 5,461,017 | A | | 10/1995 | Furtek et al. |
| 6,013,594 | A | | 1/2000 | Yang et al. |
| 2002/0026013 | A1 | | 2/2002 | Lundquist et al. |
| 2002/0052536 | A1 | | 5/2002 | Lundquist et al. |

FOREIGN PATENT DOCUMENTS

| EP | 0767184 | 8/1999 |
|---|---|---|
| WO | WO 95/25129 | 9/1995 |

* cited by examiner

*Primary Examiner*—Caixia Lu
(74) *Attorney, Agent, or Firm*—Richard R. Clikeman

(57) ABSTRACT

A catalyst composition useful for catalyzing the polymerization of olefinic monomers is disclosed, along with a polymerization method using those catalyst compositions to prepare a variety of polyolefins from olefinic monomers. A method for preparation of the catalyst composition by combining an epoxy functional porous organic polymer, a catalytic component, and an activator component is also disclosed.

10 Claims, No Drawings

OLEFIN POLYMERIZATION CATALYST COMPOSITION AND PREPARATION THEREOF

CROSS REFERENCE TO RELATED PATENT APPLICATIONS

This is a non-provisional application of prior pending U.S. provisional application serial No. 60/383,650 filed May 28, 2002.

The present invention relates to: an olefin polymerization catalyst composition including an epoxy functional porous organic polymer, a catalytic component, and an activator component; a process of making the olefin polymerization catalyst composition; and a process for preparing a variety of polyolefin products using a range of olefin polymerization catalyst compositions.

Commercial catalytic processes for the production of polyolefins, such as polyethylene and polypropylene, have traditionally relied on the use of heterogeneous Ziegler-Natta catalyst systems. Typical catalyst systems for polyethylene are exemplified by chromium catalysts and titanium/$MgCl_2$ catalysts. Although the catalyst systems are quite active and can produce high molecular weight polymers, they tend to produce a broad molecular weight distribution of a particular polyolefin and are poor at incorporating alpha olefins such as 1-hexene and 1-octene. When making copolymers, these catalysts typically produce polyethylene resins of moderately broad to very broad molecular weight distribution, as characterized by molecular weight distribution polydispersities of 3 or more. Lack of a narrow molecular weight distribution in polyolefins produced using such catalyst systems is believed due to the presence of more than one type of catalytic site.

More recently, olefin polymerization catalyst systems containing well defined single reactive sites have been developed. Single-site catalysts allow for the production of polymers with varied molecular weights, narrow molecular weight distributions and the ability to incorporate large amounts of comonomers. Metallocene catalysts based on Group 4 metals of the Periodic Table (IUPAC nomenclature) containing cyclopentadienyl groups are examples of these active single-site catalysts. Such catalysts have been disclosed in U.S. Pat. Nos. 5,064,802, 5,198,401, and 5,324,800.

The mechanism of olefin polymerization has been the subject of much study and is believed to involve generation of an unsaturated, electron deficient metal species, which coordinates olefins to form intermediate alkyl olefin complexes, subsequently undergoing rapid alkyl migration to afford a growing polymer chain. Olefin coordination followed by migration (insertion) continues until a termination step occurs or the reaction is stopped.

Several methods are currently employed to generate and stabilize the unsaturated electron deficient metal catalysts of such systems. The activation of transition metal complexes to afford stabilized, unsaturated transition metal catalysts for the polymerization of olefins is a key part of this mechanism. Several methods are currently employed to generate and stabilize the unsaturated, electron deficient metal catalysts of such systems and include halide abstraction, protonation followed by reductive elimination of an alkane or hydrogen, or oxidation. A key element of the activation process is the stabilization of the resulting activated complex using non-coordinating anions. For example, halide containing metallocene complexes can be activated using an organoaluminoxane such as methylaluminoxane (MAO) or isopropylaluminoxane. MAO serves as both a methyl alkylating agent and a non-coordinating anion. Other activating components of utility containing boron include silver tetraphenyl borate, triphenylcarbenium tetrakis (pentafluorophenyl) borate, triaryl carbenium tetraarylborates, tris(pentafluorophenyl) boron, N,N-dimethylanilinium tetra(pentafluorophenyl) borate and sodium tetrakis[3,5-bis(trifluoromethyl)-phenyl] borate. Catalyst systems using such activators have been disclosed in U.S. Pat. Nos. 4,808,561; 4,897,455; 4,921,825; 5,191052; 5,198,401; 5,387,568; 5,455,214; 5,461,017; 5,362,824; 5,498,582; 5,561,092; 5,861,352 and publications WO 91/09882; EP0206794B1; EP0507876B1; WO 95/15815; WO 95/23816; EP0563917B1; EP0633272A1; EP0633272B1; EP0675907B1; JP96-113779; EP0677907B1; WO 98/55518; WO 00/04059.

The greatest utility of single-site catalyst systems to the polyolefin industry is realized when they are used in existing gas phase and slurry phase reactors. Inorganic oxides such as silica, alumina and magnesia currently have the greatest utility as support materials in the formulation of supported Ziegler-Natta polyolefin catalyst systems. The inorganic supports have also been used with varying degrees of success in supporting metallocene and other types of single-site metal catalysts. A significant limitation of such supports, however, is the presence of surface hydroxyl groups, which can render the metallocene catalysts less active. Large quantities of MAO are used to overcome this effect, with varying degrees of success coupled with the high costs associated with using excess MAO.

EP-0767184-B1 discloses porous organic polymers as supports for olefin polymerization catalysts and activators. The disclosed porous organic polymers are acrylic polymers having polar functional groups. Most of these polar functional groups have active hydrogens capable of reacting with activators such as aluminoxanes. The disclosed polar groups are amino, imino, amide, imide, hydroxyl, formyl, carboxyl, sulfone, and thiol. Although these polar groups afford varying degrees of reactivity with aluminoxanes, they are also capable of producing undesirable side reactions that can limit the efficiency, specificity, and activity characteristics of supported catalysts produced using them. A group that is reactive with activator components, yet is less prone to side reactions than, for example, hydroxyl and thiol groups would be expected to react with activator components and catalytic components (the organometallic catalyst) to produce catalyst compositions having the efficiency, specificity, and activity characteristics desired in catalysts for olefin polymerization.

We have surprisingly found that porous organic polymers, for example macroreticular resins, bearing pendant olefinic groups may be epoxidized to form pendant epoxy groups which combine with organometallic catalysts and activators to produce olefin polymerization catalyst compositions. In addition, epoxy functional catalyst compositions can be produced directly by polymerization of monomer mixtures containing epoxy functional monomers. These olefin polymerization catalyst compositions are highly active, providing high yields of spherical polyolefins with minimal reactor fouling.

An aspect of the present invention relates to an olefin polymerization catalyst composition, wherein said catalyst composition comprises:

(a) at least one catalytic component;

(b) at least one activator component; and (c) at least one epoxy functional porous organic polymer, wherein said epoxy polymer comprises a plurality of epoxy groups covalently bound to said epoxy polymer.

A second aspect of the present invention relates to a process of making an olefin polymerization catalyst composition, said process comprising:
(a) combining:
  (i) at least one epoxy functional porous organic polymer;
  (ii) at least one catalytic component; and
  (iii) at least one activator;
(b) allowing said epoxy polymer, said catalytic component, and said activator component to react; and,
(c) optionally, isolating said catalyst composition.

A third aspect of the present invention relates to an olefin polymerization process, wherein said olefin polymerization process comprises:
(a) contacting at least one olefin monomer with at least one olefin polymerization catalyst composition;
(b) polymerizing said olefin monomer to produce a polyolefin;
(c) isolating said polyolefin, wherein said catalyst composition comprises:
  (i) at least one catalytic component;
  (ii) at least one activator component; and
  (iii) at least one epoxy functional porous organic polymer, wherein said epoxy polymer comprises a plurality of epoxy groups covalently bound to said epoxy polymer.

Used herein, the following terms have these definitions:

A "catalytic component" is an organometallic catalyst based on a metal, wherein said metal is a metal selected from the group consisting of metals of Group 3–10, lanthanide metals, actinide metals and combinations thereof.

An "activator component" is an activator selected from the group consisting of organoaluminum compounds, organoaluminoxane compounds, hydroxyaluminoxanes, aluminoxinates, organic borane compounds, inorganic borane compounds, borate anions, and mixtures thereof.

The term "ethylenically unsaturated", alternatively "olefinic", describes a molecule or functional group containing a carbon-carbon double bond, and has its usual meaning in the art.

The term "multi-ethylenically unsaturated", alternatively "polyethylenically unsaturated", "multi-olefinic", or "polyolefinic" indicates that a molecule or functional group contains two or more carbon-carbon double bonds.

"Active hydrogen bearing moieties" are moieties containing one or more hydrogen atoms which are sufficiently labile as to be removable upon addition of a catalytic component, an activator component, or combinations thereof. Examples of active hydrogen bearing moieties include, but are not limited to, alcohols, mercaptans, carboxylic acids, sulfonic acids, and phosphonic acids. In contrast, hydrogens covalently bound directly to carbon are generally considered to not be "active hydrogens" under the conditions of epoxidation, of loading with catalyst and activator components, and of olefin polymerization. Hydrogens covalently bound to carbons that will not become part of such a system upon loss of hydrogen atom, are particularly lacking in activity. Examples of hydrogens lacking activity are the methylene hydrogens of polyethylene and the hydrogens covalently bound to the Sp carbons of non-conjugated vinyl groups.

A "porogen" is that portion of the polymerization medium which is sufficiently immisible with the polymer being formed that a separate polymeric phase separates during or after polymerization. For example, a solvent that is acting as a porogen will occupy a phase separate from that occupied by the polymer upon phase separation. The "porogen" may include solvents, monomers, other compounds associated with a polymerization, or combinations thereof. A porogen is an essential feature of the process of "polymerization induced phase separation" ("PIPS") processes. A solvent may be included with the monomers used to form droplets suspended in water prior to an aqueous emulsion or suspension polymerization. If that solvent has appropriate solubility characteristics necessary to cause the droplets to be a single phase prior to polymerization, yet separate into multiple phases (usually two phases) during and after polymerization, and the solvent occupies a separate phase from that occupied by the resultant polymer, then that solvent is a porogen.

Estimation of whether a given polymer will be soluble in a given substance (e.g., a common solvent) may be made according to the well-known methods delineated in D. W. Van Krevelen, *Properties of Polymers*, 3$^{rd}$ Edition, Elsevier, pp. 189–225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents and polymers, and can be estimated using the group contribution methods of Van Krevelen. For example, to estimate whether a given polymer will be soluble in a given substance, one calculates $\delta_t^2$ for the polymer and $\delta_t^2$ for the substance. If the difference between the two, $\Delta\delta_t^2$, is greater than 25 (i.e., $\Delta\delta_t$>5), then the polymer should be insoluble in the substance. These calculations may be used to estimate whether the polymer being formed during polymerization will be insoluble in the substance and, if so, whether it will phase separate from the droplet medium while unreacted monomer is still present in that droplet medium, or whether that monomer must first be substantially consumed before phase separation will occur.

The method of Van Krevelen gives a good indication of whether a particular substance and a particular polymer will display mutual solubility. The method is most useful when the polymer is either not crosslinked or very lightly crosslinked. When the polymer of a solvent-polymer pair is moderately or highly crosslinked, it is generally true that the polymer will be less soluble in the solvent than would be the case if it were not crosslinked.

A "porous organic polymer" ("POP") is any polymeric solid that contains pores. These porous polymeric solids are typically present as plural "POP particles".

An "olefin functional porous organic polymer precursor" ("OPOP precursor") is a porous organic polymeric solid bearing a plurality of carbon-carbon double bonds covalently bound to its polymeric chains. These porous polymeric solids are typically present as plural "OPOP precursor particles".

An "epoxy functional porous organic polymer" ("EPOP") is a porous organic polymeric solid bearing a plurality of epoxy groups covalently bound to the polymer chains of the EPOP. These polymeric solids are typically present as plural particles. The epoxy group may be incorporated into the polymer chain by direct polymerization of epoxy functional monomers (e.g., glycidyl methacrylate), or by post functionalization of porous precursor polymers bearing functional groups susceptible to epoxidation. A preferred embodiment of the present invention is an EPOP prepared by epoxidation of an "OPOP precursor". The EPOP thus prepared may be substantially free of unreacted olefinic groups, or may contain residual olefinic groups that did not react during the epoxidation. Preferably, the EPOP will contain residual olefinic groups at a concentration of 0.00 mmole/g to 10 mmole/g, more preferably 0.00 mmole/g to 5 mmole/g, and most preferably 0.00 mmole/g to 2 mmole/g, based on the weight of EPOP. All ranges set forth herein are inclusive and combinable. The EPOP thus prepared may also be substantially free of active hydrogen bearing moieties. Preferably, the EPOP will contain active hydrogen bearing moieties at a concentration of less than 0.1 mmole/g, more preferrably less than 0.01 mmole/g, and most preferably less than 0.005 mmole/g, based on the weight of EPOP. These porous polymeric solids are typically present as plural "EPOP particles".

An "olefin polymerization catalyst composition", or simply "catalyst composition" is a composition which includes: (a) at least one catalytic component; (b) at least one activator component; and (c) at least one epoxy functional porous organic polymer. Particles of an "olefin polymerization catalyst composition" are "olefin polymerization catalyst composition particles", or simply "catalyst particles". Catalyst particles may have a wide range of sizes and shapes, with spherical shape being particularly desirable. Catalyst particles bear a plurality of sites of interaction, wherein the interaction is: between pendant epoxy groups and activators; between pendant epoxy groups and catalytic components; between activators and catalytic components; or among pendant epoxy groups, activators, and catalytic components; and any of these combinations may exist within a single "catalyst particle". Typically, plural catalyst particles are used to effect homopolymerization of ethylene or copolymerization of ethylene with ●-olefins within a given reactor system. The catalyst particles facilitate production of polyolefin particles the shapes of which mimick the shapes of the initial catalyst particles to give improved morphology. A general process for incorporating a range of catalytic components and activator components within the epoxy functional porous organic polymer is disclosed which affords utility in the subsequent production of specific polyolefin products.

Herein, the term "particle size distribution" and the acronym "PSD" are used interchangeably. Further, the terms "particle size" and "particle diameter" are used interchangeably. Polydispersity is used in the art as a measure of the breadth of the PSD. More generally, "polydispersity" is a construct of applied mathematics that may be used to describe the distribution of sizes of any measurable feature common to a plurality of items. Examples of distributions that may be described in this way include the lengths of polymer chains (i.e., molecular weights) and the diameters of particles (i.e., particle sizes). Used herein, "polydispersity" is a description of the distribution of particle sizes for the plural particles of the invention. As such, "polydispersity" and "PSD polydispersity" are used interchangeably. PSD polydispersity is calculated from the weight average particle size, dw, and the number average particle size, dn, according to the formulae:

PSD Polydispersity=$(d_w)/(d_n)$ where $d_n = \Sigma n_i d_i / \Sigma n_i$ $d_w = \Sigma n_i d_i d_i / \Sigma n_i d_i$, and where $n_i$ is the number of particles having the particle size $d_i$ It has been discovered that porous organic polymers ("POP"s) containing a plurality of epoxy groups react with a variety of catalytic components and activator components, forming an olefin polymerization catalyst composition which can be usefully employed for the subsequent production of polyolefins. These "EPOP"s are typically produced in polymeric form by any of a variety of polymerization methods. Macroporous organic polymers, usually particulate, prepared by suspension or emulsion polymerization are particularly useful. The number of bound epoxy groups, the pore size, the surface area, the spatial distribution of epoxy groups within and upon the particles, and the morphology of the EPOP can be synthetically controlled by judicious selection of polymerization conditions. It has been further discovered that the EPOPs and the olefin polymerization catalyst composition prepared therefrom can be prepared in shapes which are useful in the production of polyolefins. Alternatively, the EPOPS and catalyst compositions derived therefrom can be coated onto substrates, allowing for the formation of layered catalyst compositions useful for coating objects with polyolefins. The epoxy groups may be disposed on surfaces of the EPOP or may be dispersed throughout.

The "catalytic component" of the "catalyst composition" usefully employed in the present invention can be a Ziegler-Natta catalyst or a single-site catalyst. The Ziegler-Natta based catalytic components usefully employed in accordance with the present invention are exemplified by, but not limited to conventional Titanium (Ti/Mg) and Chromium based catalysts.

The "catalytic components" usefully employed in accordance with the invention are organometallic compositions of transition metals. The transition metal catalysts preferably are of the Ziegler-Natta type or Phillips type catalysts and more preferably are single site catalysts, such as a Unipol™ catalyst, Insite™ catalyst or Versipol™ catalyst. The most preferred catalysts are based on organometallic compounds of zirconium, titanium, chromium, vanadium, iron, cobalt, palladium, copper, and nickel.

Illustrative, but not limiting examples of bis (cyclopentadienyl) group 4 metal compounds which may be used as the catalytic component in the preparation of the catalyst composition of the present invention are listed below:

dihydrocarbyl-substituted bis(cyclopentadienyl)zirconium compounds, including bis(cyclopentadienyl)zirconium dimethyl, bis (cyclopentadienyl)zirconium diethyl, bis(cyclopentadienyl)zirconium dipropyl, bis (cyclopentadienyl)zirconium dibutyl, bis(cyclopentadienyl)zirconium diphenyl, bis (cyclopentadienyl)zirconium dineopentyl, bis(cyclopentadienyl)zirconium di(m-tolyl), bis (cyclopentadienyl)zirconium di(p-tolyl)

and chemically/structurally related compounds;

dihydrido-substituted bis(cyclopentadienyl) zirconium compounds, including bis(cyclopentadienyl)zirconium dihydride, and chemically/structurally related compounds;

hydrido halide-substituted bis(cyclopentadienyl) zirconium compounds, including bis(cyclopentadienyl)zirconium hydrido chloride, and chemically/structurally related compounds;

hydrocarbyl hydride-substituted bis(cyclopentadienyl) zirconium compounds including bis(cyclopentadienyl)zirconium methyl hydride, bis(pentamethylcyclopentadienyl)zirconium (phenyl) (hydride), bis(pentamethylcyclopentadienyl)zirconium (methyl) (hydride),
and chemically/structurally related compounds;
(monohydrocarbyl-substituted cyclopentadienyl)zirconium compounds including
(methylcyclopentadienyl)(cyclopentadienyl) zirconium dimethyl,
bis(methylcyclopentadienyl)zirconium dimethyl,
bis(dibutylcyclopentadienyl)zirconium dimethyl,
and chemically/structurally related compounds;
(polyhydrocarbyl-substituted-cyclopentadienyl) zirconium compounds, including
(dimethylcyclopentadienyl) (cyclopentadienyl) zirconium dimethyl,
bis(dimethylcyclopentadienyl) zirconium dimethyl,
bis(pentamethylcyclopentadienyl) zirconium dimethyl,
and chemically/structurally related compounds;
(bridged-cyclopentadienyl)zirconium compounds, including
methylene bis(cyclopentadienyl)zirconium dimethyl,
methylene bis(cyclopentadienyl)zirconium dihydride,
ethylene bis(cyclopentadienyl)zirconium dimethyl,
dimethylsilylbis(cyclopentadienyl)zirconium dimethyl,
ethylenebis(cyclopentadienyl)zirconium dihydride,
dimethylsilyl bis(cyclopentadienyl)zirconium dihydride,
and chemically/structurally related compounds;
chiral and $C_2$-symmetry compounds; asymetrically bridged-dicylopentadienyl compounds, including
methylene(cyclopentadienyl)(1-fluorenyl)zirconium dimethyl, dimethysilyl(cyclopentadienyl)(1-fluorenyl)zirconium dihydride,
isopropyl(cyclopentadienyl)(1-fluorenyl)zirconium dimethyl,
isopropyl(cyclopentadienyl)1-octahydrofluorenyl)zirconium dimethyl,
dimethylsil(methylcyclopentadienyl)(1-fluorenyl)zirconium dihydride,
methylene(cyclopentadienyl(tetramethylcyclopentadienyl) zirconium dimethyl,
and chemically/structurally related compounds;
racemic and meso isomers of symmetrically bridged substituted
dicyclopentadienyl compounds, including ethylenebis(indenyl)zirconium dimethyl,
dimethylsilylbis(indenyl)zirconium dimethyl,
ethylenebis(tetrahydroindenyl)zirconium dimethyl, and
dimethylsilylbis(3-trimethylsilylcyclopentadientyl) zirconium dihydride;
zirconacycles, including
bis(pentamethylcyclopentadienyl) zirconacyclobutane,
bis(pentamethylcyclopentadienyl) zirconacyclopentane,
bis(cyclopentadienyl)zirconaindane, and
1-bis(cyclopentadienyl)zircona-3-dimethylsila-cyclobutane;
olefin, diolefin and aryne ligand substituted bis(cyclopentadienyl)zirconium compounds, inncluding bis(cyclopentadienyl) (1,3-butadiene)zirconium,
bis(cyclopentadienyl) (2,3-dimethyl-1,3butadiene) zirconium, and
bis(pentamethylcyclopentadienyl)(benzyne)zirconium; and
bis(cyclopentadienyl) zirconium compounds in which a substituent on the cyclopentadienyl radical is bound to the metal, including
(pentamethylcyclopentadienyl) (tetramethylcyclopentadienylmethylene) zirconium,
hydride, (pentamethylcyclopentadienyl), (tetramethylcyclopentadienylmethylne)zirconium phenyl, and
chemically/structurally related compounds.

Illustrative, but non-limiting examples of bis (cyclopentadienyl)hafnium and bis(cyclopentadienyl) titanium compounds that, as the catalytic component, usefully comprise the catalyst composition of the present invention are disclosed in publications of Alt and Koeppl, such as Chem. Rev., 100, 1205–1222, 2000 and Hlatky, Chem. Rev., 100, 1347–1376, 2000, the contents of which are usefully employed in accordance with the invention. Chemically and structurally related bis(cyclopentadienyl) hafnium compounds and bis(cyclopentadienyl)titanium compounds as well as other catalysts of Group 4 metals that are useful in the catalyst composition of the present invention would be apparent to those skilled in the art based on their respective chemical structures and reactivities in olefin polymerizations.

Illustrative, but non-limiting examples of Group 4 and 6 compounds containing a cyclopentadienyl ring bridging to a nitrogen group via a carbon or silicon group which may be used in the preparation of the catalytic composition of the present invention include:
dimethylsilycyclopentadienyl-tertbutylamido zirconium dimethyl,
dimethylsilycyclopentadienyl-tertbutylamido titanium dimethyl,
dimethylsilytetramethylcyclopentadienyl-tertbutylamido zirconium dimethyl,
dimethylsilytertbutylcyclopentadienyl-tertbutylamido zirconium dimethyl,
dimethylsilytetramethylcyclopentadienyl-tertbutylamido titanium dimethyl,
dimethylsilytertbutylcyclopentadienyl-tertbutylamido titanium dimethyl,
dimethylsilytetramethylcyclopentadienyl-tertbutylamido hafnium dimethyl,
dimethylsilytertbutylcyclopentadienyl-tertbutylamido hafnium dimethyl,
dimethylsilytetramethylcyclopentadienyl-tertbutylamido zirconium dimethyl, and
ethyl enetetram ethyl cyclopentadienyldimethyl amino chromium dim ethyl.

Illustrative but non-limiting examples of Group 4 or 6 metal complexes containing bidentate, tridentate or other multidentate ligands that, as the catalytic component, usefully comprise the catalyst composition of the present invention include:
(NC(CH3)2CH2CH2C(CH3)2N)Cr(CH2C6H5)2, and
bis[N-(3-t-butylsalicylidene)phenylaminato] zirconium dichloride.

Illustrative but non-limiting examples of Group 8–11 metal complexes containing bidentate, tridentate or other multidentate ligands that, as the catalytic component, usefully comprise the catalyst composition of the present invention are disclosed in publications of Ittel and Brookhart, such as Chem. Rev., 100, 1169–1203, 2000, Hlatky, Chem. Rev., 100, 1347–1376, 2000, and Gibson, Angew. Chem. Int. Ed. 38, 428–447, the contents of which are usefully employed in accordance with the present invention. Preferred of Group 8–11 catalysts that, as the catalytic component, usefully comprise the catalyst composition of the present invention are:
$\{(2,6-iPr_2C_6H_3)-N=C(H)-C(H)=N-(2,6-iPr_2C_6H_3)\}NiBr_2$,
$\{(2,6-iPr_2C_6H_3)-N=C(Me)-C(Me)=N-(2,6-iPr_2C_6H_3)\} NiBr_2$,
$\{(2,6-iPr_2C_6H_3)-N=C(Ph)-C(Ph)=N-(2,6-iPr_2C_6H_3)\}$ NiBr2,
$\{(2,6-Me_2C_6H_3)-N=C(H)-C(H)=N-(2,6-Me_2C_6H_3)\}NiBr2$, {(2,6-Me$_2$C$_6$H$_3$)—N=C(Me)—C(Me)=N-(2,6-Me$_2$C$_6$H$_3$)}NiBr$_2$, {(2,6-Me$_2$C$_6$H$_3$)—N=C(Ph)—C(Ph)=N-(2,6-Me$_2$C$_6$H$_3$)}NiBr$_2$, {(2,6-iPr$_2$C$_6$H$_3$)—N=C(H)—C(H)=N-(2,6-iPr$_2$C$_6$H$_3$)}Pd(Cl)Me,

[{(2,6-iPr$_2$C$_6$H$_3$)—N=C(Me)—C(Me)=N-(2,6-iPr$_2$C$_6$H$_3$)} PdMe (NC—Me)]+,

[{(2,6-iPr$_2$C$_6$H$_3$)—N=C(Ph)—C(Ph)=N-(2,6-iPr$_2$C$_6$H$_3$)} PdMe (NC—Me)]+,

[{(2,6-iPr$_2$C$_6$H$_3$)—N=C(H)—C(H)=N-(2,6-iPr$_2$C$_6$H$_3$)} PdMe (NC—Me)]+,

[{(2,6-iPr$_2$C$_6$H$_3$)—N=C(Me)—C(Me)=N-(2,6-iPr$_2$C$_6$H$_3$)} PdMe (NC—Me)]+,

[{(2,6-iPr$_2$C$_6$H$_3$)—N=C(Ph)—C(Ph)=N-(2,6-iPr$_2$C$_6$H$_3$)} PdMe (NC—Me)]+,

[{(2,6-iPr$_2$C$_6$H$_3$)—N=C(Me)—C(Me)=N-(2,6-iPr$_2$C$_6$H$_3$)} NiMe (OEt$_2$)]+,

[{(2,6-iPr$_2$C$_6$H$_3$)—N=C(Ph)—C(Ph)=N-(2,6-iPr$_2$C$_6$H$_3$)} NiMe (OEt$_2$)]+,

{[(2,6-PhN=C(CH$_3$))$_2$C$_5$H$_3$N] CoCl$_3$}, {[(2,6-PhN=C(CH$_3$))$_2$C$_5$H$_3$N] FeCl$_2$}, and {[(2,6-PhN=C(CH$_3$))$_2$C$_5$H$_3$N] CoCl$_3$}, {[(2,6-PhN=C(CH$_3$))$_2$C$_5$H$_3$N] FeCl$_3$}, and bis (2,2'-bipyridyl) iron diethyl.

Chemically and structurally related catalytically active Iron, Cobalt, Nickel, Palladium, and Copper compounds as well as other catalysts of Group 8–11 metals that are useful in the catalyst composition of the present invention would be apparent to those skilled in the art based on their respective chemical structures and reactivities in olefin polymerizations.

The "catalytic component" of the present invention is typically a component in the "catalyst composition" of the present invention at a concentration of 0.0001 mmole/gram to 2.00 mmoles/g, preferably 0.0001 mmole/g to 1.5 mmoles/g, more preferably 0.0005 mmole/g to 1.5 mmoles/g, and most preferably 0.001 mmole/g to 1.00 mmole/g, defined as mmoles of metal per weight of the epoxy functionalized porous organic polymer.

Illustrative, but non-limiting examples of the "activator component" that usefully comprises the "olefin polymerization catalyst composition" of the present invention are disclosed in publications of Chen and Marks, such as Chem. Rev., 100, 1391–1434, 2000, Coates, such as Chem. Rev., 100, 1223–1252, 2000, Resconi et al, such as Chem. Rev., 100, 1253–1346, 2000, Fink et al, such as Chem. Rev., 100, 1377–1390, 2000 Alt and Koeppl, such as Chem. Rev., 100, 1205–1222, 2000 and Hlatky, Chem. Rev., 100, 1347–1376, 2000, the contents of which are usefully employed in accordance with the invention. Activator components usefully comprising the catalyst composition of the present invention, for example, include: aluminum alkyls such as Al(C2H5)3, Al(CH2CH(CH3)2)3, Al(C3H7)3, Al((CH2)3CH3)3, Al((CH2)5CH3)3, Al(C6F5)3, Al(C2H5)2Cl, Al2(C2H5)3C12, AlCl3; aluminoxanes such as methylaluminoxane (MAO), modified methyl aluminoxane (MMAO), isobutylaluminoxane, butylaluminoxane, heptylaluminoxane and methylbutylaluminoxane; and combinations thereof. Both stoichiometric and non-stoichiometric quantities of activator components are usefully employed in the "catalyst composition" of the present invention. Chemically and structurally useful aluminum compounds as well as other catalysts of Group 13 elements that are useful in the catalyst composition of the present invention would be apparent to those skilled in the art based on their respective chemical structures and activities in olefin polymerizations.

The activator component further comprises hydroxyaluminoxanes. Hydroxyaluminoxanes, and methods of preparing them, are disclosed in U.S. Pat. No. 6,160,145. The hydroxyaluminoxane has a hydroxyl group bonded to at least one of its aluminum atoms. To form these hydroxyaluminoxanes, a sufficient amount of water is reacted with an alkyl aluminum compound to result in formation of a compound having at least one HO-Al group and having sufficient stability to allow reaction with a d- or f-block organometallic compound to form a hydrocarbon.

The alkyl aluminum compound used in forming the hydroxyaluminoxane reactant can be any suitable alkyl aluminum compound other than trimethylaluminum. Thus at least one alkyl group has two or more carbon atoms. Preferably each alkyl group in the alkyl aluminum compound has at least two carbon atoms. More preferably each alkyl group has in the range of 2 to about 24, and still more preferably in the range of 2 to about 16 carbon atoms. Most preferred are alkyl groups that have in the range of 2 to about 9 carbon atoms each. The alkyl groups can be cyclic (e.g., cycloalkyl, alkyl-substituted cycloalkyl, or cycloalkyl-substituted alkyl groups) or acyclic, linear or branched chain alkyl groups. Preferably the alkyl aluminum compound contains at least one, desirably at least two, and most preferably three branched chained alkyl groups in the molecule. Most preferably each alkyl group of the aluminum alkyl is a primary alkyl group, i.e., the alpha-carbon atom of each alkyl group carries two hydrogen atoms.

Suitable aluminum alkyl compounds which may be used to form the hydroxyaluminoxane reactant include dialkylaluminum hydrides and aluminum trialkyls. Examples of the dialkylaluminum hydrides include diethylaluminum hydride, dipropylaluminum hydride, diisobutylaluminum hydride, di(2,4,4-trimethylpentyl)aluminum hydride, di(2-ethylhexyl)aluminum hydride, di(2-butyloctyl)aluminum hydride, di(2,4,4,6,6-pentamethylheptyl)aluminum hydride, di(2-hexyldecyl)aluminum hydride, dicyclopropylcarbinylaluminum hydride, dicyclohexylaluminum hydride, dicyclopentylcarbinylaluminum hydride, and analogous dialkylaluminum hydrides. Examples of trialkylaluminum compounds which may be used to form the hydroxyaluminoxane include triethylaluminum, tripropylaluminum, tributylaluminum, tripentylaluminum, trihexylaluminum, triheptylaluminum, trioctylaluminum, and their higher straight chain homologs; triisobutylaluminum, tris(2,4,4-trimethylpentyl)aluminum, tri-2-ethylhexylaluminum, tris(2,4,4,6,6-pentamethylheptyl)aluminum, tris(2-butyloctyl)aluminum, tris(2-hexyldecyl)aluminum, tris(2-heptylundecyl)aluminum, and their higher branched chain homologs; tri(cyclohexylcarbinyl)aluminum, tri(2-cyclohexylethyl)aluminum and analogous cycloaliphatic aluminum trialkyls; and Tri(pentafluoro)aluminum. Triusobutylaluminum has proven to be an especially desirable alkyl aluminum compound for producing a hydroxyaluminoxane. Hydroxyisobutylaluminoxane (HOIBAO) is a preferred hydroxyaluminoxane. The hydroxyisobutylaluminoxane is essentially devoid of unreacted triisobutylaluminum.

Useful activator components further include aluminoxane salt compositions (aluminoxinates) as disclosed in U.S. Pat. No. 5,922,631.

Activator components useful in the present invention further include organic borane compounds, inorganic borane compounds, and borate anions. Preferred examples of boron containing activator components employed in the catalyst composition of the present invention are trifluoroborane, triphenylborane, Tris(4-fluorophenyl)borane, Tris(3,5-difluorophenyl)borane, Tris(4-fluoromethylphenyl)borane, Tris(pentafluorophenyl)borane, Tris(tolyl)borane, Tris(3,5-dimethylphenyl)borane, Tris(3,5-difluorophenyl)borane, Tris(3,4,5-trifluorophenyl)borane, Dimethylanilinium (pentafluorophenyl) borate, sodium[B{3,5-$(CF_3)_2C_6F_3$}$_4$], [H(OEt$_2$)$_1$][B{3,5-$(CF_3)_2C_6F_3$}$_4$]. Both stoichiometric and non-stoichiometric quantities of activators are usefully employed in the catalyst matrix of the present invention using triaryl carbenium tetraarylborates, N,N-dialkylanilinium salts such as N,N-dimethylanilinium tetra (pentafluorophenyl)borate, N,N-diethylanilinium tetra (phenyl)borate, N,N-2,4,6-pentamethylanilinium tetraphenylborate and chemically related Group 13 compounds; dialkyl ammonium salts such as di(i-propyl) ammonium tetra(pentafluorophenyl)borate, dicyclohexylammonium tetra(phenyl)boron and chemically related Group 13 compounds; triaryl phosphonium salts such as triphenylphosphonium tetraphenylborate, tri(methylphenyl) phosphonium tetra(phenyl)borate, tri(dimethylphenyl) phosphonium tetra(phenyl)borate and chemically related Group 13 compounds. Any complex anions or compounds forming such anions that exhibit an ability to abstract and activate the metal compounds would be within the scope of the catalyst composition of the present invention. Chemically and structurally useful boron compounds that are useful in the catalyst composition of the present invention would be apparent to those skilled in the art based on their respective chemical structures and activities in olefin polymerizations.

The "activator component" of the present invention is typically a component of the "catalyst composition" of the present invention at a concentration of 0.01 mmole/gram to 50 mmoles/g, preferably 0.01 mmole/g to 20 mmoles/g, more preferably 0.05 mmole/g to 10 mmoles/g, and most preferably 0.1 mmole/g to 5 mmole/g, defined as mmoles of Aluminum per weight of the epoxy functionalized porous organic polymer.

The "olefin functional porous organic polymer precursor" ("OPOP precursor") may be prepared by any method capable of producing a porous organic polymer, the polymeric chains of which bear ethylenically unsaturation. It is particularly desirable that the olefinic groups are pendant to the polymeric chains. Of particular utility in the formation of the OPOP precursor are aqueous suspension and emulsion polymerization methods, carried out in the presence of appropriate porogens and stabilizers, and initiators.

Alternative polymerization technologies to produce polymers and copolymers containing ethylenic unsaturation useful in this present invention include, but are not limited to, emulsion polymerization, solution polymerization, precipitation polymerization, anionic polymerization, seeded polymerization, and condensation polymerizations. Essentially any ethylenically unsaturated or multi-ethylenically unsaturated monomer can be usefully incorporated into the OPOP precursor, the EPOP, and the catalyst composition of present invention. Non-limiting examples of olefin containing functional groups include vinyl, allyl, and alkenyl groups. Synthetic methods, physical properties and processing of polymers having significant residual double bonds are disclosed in U.S. patent application Ser. No. 09/466,591, the contents of which is herein usefully employed in accordance with the present invention.

Several methods were used to characterize and quantify the amount of ethylenically unsaturated groups contained in the OPOP precursors and EPOPs useful in the present invention. These include the use of solid state $^{13}C$ NMR (nuclear magnetic resonance), CP/MAS-TOSS (cross polarization magic angle spinning with total sideband suppression), and infrared spectroscopy. Chemical derivitization of olefin groups is yet another method used to quantify the amount of olefinic groups contained in a material. The use of a variety of characterization techniques to quantify the amount of pendant vinyl groups contained in a polydivinylbenzene polymer is disclosed in publications of Law et al, such as Macromolecules 1997,30, 2868-275 and Hubbard et al., React. Funct. Polym. Vol. 36 (1), pages 17–30 (1998).

The porosities of OPOP precursors and EPOPs described herein by example were measured by Nitrogen adsorption according to methods disclosed by Brunauer, et al., J. Am. Chem Soc. 60, 309 (1938). Larger pore sizes (e.g., greater than 0.05 microns) are preferably measured using mercury porosimetry well know to the art.

According to a preferred embodiment of the preparation of the OPOP precursor of the present invention, olefin containing polymers are prepared from suspension or emulsion polymerization of commerical grade divinylbenzene (DVB). OPOP precursors may be macroreticular polymers, microporous polymers or gel polymers. It is a useful advantage of the invention that residual pendant vinyl groups can be synthetically and morphologically controlled by varying the reaction conditions. The OPOP precursors prepared by the suspension or emulsion polymerization of DVB, are crosslinked and thus insoluble, preferably have spherical structures, and can be produced at particle sizes between 50 nanometers and 1000 microns. In addition, OPOP precursor can be made porous by addition of a porogen during the polymerization, further enhancing its reactivity with epoxidation agents and the utility of EPOPs formed from it. The amount of porosity, the pore diameter, and surface area can be controlled by varying the amount and type of porogen used during the polymerization as disclosed in publications of Meitzner, et. al., particularly those related to U.S. Pat. No. 4,382,124, the contents of which are usefully employed in accordance with the invention.

The OPOP precursors suitable for conversion to EPOPs include, for example, divinylbenzene polymers, divinylbenzene copolymers, styrene/divinylbenzene copolymers, divinylbenzene resins, cross-linked divinylbenzene polymers, styrenelbutadiene copolymers, styrene/isoprene copolymers, vinylsiloxane polymers and combinations thereof.

Olefin functional porous organic polymer precursors produced by emulsion polymerization are preferably spherical, with average particle diameter of 50 nanometers to 1 micron. OPOP precursors produced by suspension, polymerization are preferably spherical, having average particle diameters of typically 0.05 micron to 1,000 microns. The preferred OPOP precursor diameter is 5 $\mu$m to 500 $\mu$m, more preferably 10 $\mu$m to 100 $\mu$m, and most preferably 20 $\mu$m to 80 $\mu$m. The particle size distribution polydispersity for the plural OPOP precursor particles is typically 1.00 to 3.00, preferably 1.00 to 1.50, more preferably 1.00 to 1.30, and most preferably 1.00 to 1.20. Average particle diameter and PSD polydispersity across these ranges can be achieved through selection of reaction conditions, through classification of the particles, or some combination of both methods, all according to methods well known in the art of suspension polymerization. The surface area of the OPOP precursor is typically 10 $m^2$/gram to 1,000 $m^2$/gram, based on weight of OPOP precursor particle (as measured by the BET Nitrogen absorption method supra), preferably 50 $m^2$/g to 1,000 $m^2$/g, more preferably 100 $m^2$/g to 800 $m^2$/gram, and most preferably 200 $m^2$/g to 800 $m^2$/gram. The sizes of the pores of the OPOP precursor are typically 0.005 microns to 10 microns, preferably 0.01 μm to 2.00 μm, more preferably 0.02 μm to 1.00 μm, and most preferably 0.02 μm to 0.5 μm. The OPOP precursors typically have a pore volume of 0.10 cc/g to 10 cc/gram, based on the weight of OPOP precursor, preferably 0.30 cc/g to 4.0 cc/g, more preferably 0.50 cc/g to 3.0 cc/g, and most preferably 1.00 cc/g to 2.50 cc/g. The volume percent of total pore volume of the OPOP precursor deriving from pores of size less than 0.050 microns is typically 20 vol % to 95 vol %, preferably 30% to 80%, more preferably 40% to 70%, and most preferably greater than 50% to 60%.

A typical preparation of plural OPOP precursor particles, for example, may include preparation of a continuous aqueous phase solution containing suspension aids (such as dispersants, protective colloids and buffers), followed by mixing with a monomer mixture containing 2 to 100% polyvinylaromatic monomer, free-radical initiator and 2 to 5 parts porogen (such as toluene, xylenes, (C4–C10)-alkanols, (C6–C12)-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and (C4–C10) alcohols may be removed by distillation or solvent washing, and polyalkylene glycols by water washing. The resulting macroporous copolymer is then isolated by conventional means, such as dewatering followed by drying.

It is preferred that the multi-ethylenically unsaturated monomers used to prepare the OPOP precursors and the directly polymerized EPOPs of the present invention are polyvinylaromatic monomers. Suitable polyvinylaromatic monomers that may be used in the preparation of the macroporous copolymers useful in the process of the present invention include, for example, one or more monomers selected from the group consisting of divinylbenzene, 1,3, 5-trivinylbenzene, divinyltoluene, divinylnaphthalene, and divinylxylene. It is understood that any of the various positional isomers of each of the aforementioned crosslinkers is suitable. More preferably, the polyvinylaromatic monomer is divinylbenzene. Typically, the OPOP precursor comprises 2 weight % to 100 weight %, preferably 20 weight % to 100 weight %, more preferably greater than 50 weight % to 100 weight %, and most preferably greater than 60 weight % to 100 weight % multi-ethylenically unsaturated monomer, as polymerized units, based on the weight of the OPOP precursor Used herein, weight percent values for multi-ethylenically unsaturated monomer are calculated taking into account impurities that are not multi-ethylenically unsaturated.

Optionally, non-aromatic crosslinking monomers, such as ethyleneglycol diacrylate, ethyleneglycol dimethacrylate, vinyl cyclohexene, butadiene, trimethylolpropane triacrylate, trimethylolpropane trimethacrylate, diethyleneglycol divinyl ether and trivinylcyclohexane, may be used in addition to the polyvinylaromatic crosslinker.

It is preferred that the monoethylenically unsaturated monomers used to prepare the OPOP precursors and the directly polymerized EPOPs of the present invention are monounsaturated vinylaromatic monomers. Suitable monounsaturated vinylaromatic monomers that may be used in the preparation of OPOP precursors and directly polymerized EPOPs of the present invention by either suspension, emulsion or other suitable polymerization, methods include, for example, styrene, α-methylstyrene, (C1–C4)alkyl-substituted styrenes and vinylnaphthalene. More preferably, one or more monounsaturated vinylaromatic monomers is selected from the group consisting of styrene and (C1–C4)alkyl-substituted styrenes. Included among the suitable (C1–C4)alkyl-substituted styrenes are, for example, ethylvinylbenzenes, vinyltoluenes, diethylstyrenes, ethylmethylstyrenes and dimethylstyrenes. It is understood that any of the various positional isomers of each of the aforementioned vinylaromatic monomers is suitable. Typically, an OPOP precursor comprises zero weight % to 98 weight %, preferably 0 weight % to 90 weight %, more preferably 0 weight % to 50 weight %, and most preferably 0 weight % to 40 weight % monoethylenically unsaturated vinylaromatic monomer, as polymerized units, based on the total weight of OPOP precursor.

Optionally, non-aromatic vinyl monomers, such as aliphatic unsaturated monomers, for example, vinyl chloride, acrylonitrile, and alkyl esters of (meth)acrylic acids may also be used in addition to the vinylaromatic monomer. When used, the non-aromatic monoethylenically unsaturated monomers preferably comprise as polymerized units, from zero to 20%, more preferably from zero to 10%, and most preferably from zero to 5% of the OPOP precursor, based on the total monomer weight used to form the OPOP presursor.

The "epoxy functional porous organic polymers" usefully employed in accordance with the invention are solid porous organic polymers having covalently bound epoxy groups. EPOPs may be macroreticular polymers, microporous polymers or gel polymers. EPOPs may be prepared by any method capable of producing a porous organic polymer, the polymeric chains of which bear epoxy groups. EPOPs may be prepared by epoxidation of OPOP precursors, or they may be prepared directly by polymerizing a mixture that includes at least one epoxy functional monomer, at least one multi-ethylenically unsaturated monomer, and at least one porogen.

Preparation of epoxy functional porous organic polymers from olefin functional porous organic polymer precursors can be accomplished by a variety of epoxidation reactions. Reagents useful for conversion of the vinyl groups of OPOP precursors to the epoxy groups of EPOPs include, for example: peroxyformic acid; peroxyacetic acid; peroxybenzoic acid; monoperoxyphthalic acid; magnesium monoperoxyphthalate; peroxytrifluoroacetic acid; m-chloroperbenzoic acid (MCPBA); hydrogen peroxide with a phase transfer catalyst, methyltrioctylammonium tetrakis(diperoxotungsten)phosphate; monoperoxyphthalic acid; and dimethyldioxirane (DMD), as disclosed in *Reactive and Functional Polymers* 42 (1999) 279–289, GB2,330, 358A, and *J. Organic Chemistry* 60 (1995) 1391–1407. Preferably, the reagent for epoxidation of vinyl groups of OPOP precursors is chosen from m-chloroperbenzoic acid and dimethyldioxirane.

Typically the number of equivalents of epoxidizing reagent used per vinyl group of the OPOP precursor is 0.50 to 10, preferably 0.90 to 5.0, more preferably 1.0 to 5.0, and most preferably 1.0 to 2.0. These epoxidation reactions convert the olefinic double bonds of the OPOP precursor into epoxy groups. This epoxidation is typically accomplished without significant change in the structural characteristics of the OPOP precursor particles upon which and within which the epoxidation is being carried out. As a result, the structural characteristics desired in an OPOP precursor are similar to, or identical to, those desired in the EPOP to which it is transformed by epoxidation.

EPOPs prepared by epoxidation of OPOP precursors, themselves prepared by suspension polymerization, are preferably spherical, having average particle diameters of typically 0.05 microns to 1,000 microns. The preferred EPOP diameter is preferably 5 μm to 500 μm, more preferably 10 μm to 100 μm, and most preferably 20 μm to 80 μm. The particle size distribution polydispersity for the plural EPOP particles is typically 1.00 to 3.00, preferably 1.00 to 1.50, more preferably 1.00 to 1.30, and most preferably 1.00 to 1.20. Average particle diameter and PSD polydispersity across these ranges can be achieved through selection of reaction conditions, through classification of the particles, or some combination of both methods, all according to methods well known in the art of suspension polymerization. The surface area of the EPOP is typically 10 $m^2$/gram to 1,000 $m^2$/gram, based on weight of EPOP particle (as measured by the BET Nitrogen absorption method supra), preferably 50 $m^2$/g to 1,000 $m^2$/g, more preferably 100 $m^2$/g to 800 $m^2$/gram, and most preferably 200 $m^2$/g to 800 $m^2$/gram. The sizes of the pores of the EPOP are typically 0.005 microns to 10 microns, preferably 0.01 μm to 2.00 μm, more preferably 0.02 μm to 1.00 μm, and most preferably 0.02 μm to 0.5 μm. The EPOPs typically have a pore volume of 0.10 cc/g to 10 cc/gram, based on the weight of EPOP, preferably 0.30 cc/g to 4.0 cc/g, more preferably 0.50 cc/g to 3.0 cc/g, and most preferably 1.00 cc/g to 2.50 cc/g. The volume percent of total pore volume of the EPOP deriving from pores of size less than 0.050 microns is typically 20 vol % to 95 vol %, preferably 30% to 80%, more preferably 40% to 70%, and most preferably greater than 50% to 60%. Typically, the concentration of epoxy groups covalently bound to an EPOP is 0.01 mmole/g EPOP to 10.0 mmole/g EPOP, preferably 0.05 mmole to 5.0 mmole, more preferably 0.10 mmole to 3.0 mmole, and most preferably 0.10 mmole to 2.0 mmole per gram EPOP.

Although EPOPs bearing active hydrogen moieties may be combined with catalytic components and activator components to form catalyst compositions useful for catalyzing the polymerization of olefins, it often desirable to minimize the number of different types of sites available for interaction with catalytic components and activator components. As a result, it is preferred that the EPOP of the present invention contain less than 0.1 mmole/g, more preferably less than 0.01 mmole/g, and most preferably less than 0.005 mmole/g of active hydrogen moieties, based on the weight of the EPOP.

EPOPs may also be prepared by post functionalization of OPOP precursors bearing active hydrogen moieties such as hydroxy, amino, monoalkylamino, and mercapto with epichlorohydrin, as disclose in W. G. Potter, *Epoxide Resins*, Springer-Verlag, New York, 1970 and published patent application US2002/0042493 A1. In like manner, other porous organic polymers that do not contain olefinic groups, but bear active hydrogen moieties such as hydroxy, amino, monoalkylamino, and mercapto, may also be functionalized with epoxy groups by reacting the active hydrogen moieties with epichlorohydrin.

An alternative method for preparation of the EPOP of the present invention is preparation directly from ethylenically unsaturated monomers, at least one of which is an epoxy functional monomer. As such, suspension polymerization methods described herein to prepare OPOP precursors may also be used to prepare directly polymerized EPOPs. These "directly polymerized EPOP"s may be prepared by aqueous suspension or emulsion polymerization. EPOPs produced by emulsion polymerization of monomer mixtures including epoxy functional monomers are preferably spherical, with average particle diameter of 50 nanometers to 1 micron. Directly polymerized EPOPs produced by suspension polymerization are preferably spherical, having average particle diameters of typically 0.05 micron to 1,000 microns. The preferred directly polymerized EPOP diameter is 10 μm to 100 μm, more preferably 20 μm to 80 μm, and most preferably 20 μm to 60 μm. The particle size distribution polydispersity for the plural EPOP particles is typically 1.00 to 3.00, preferably 1.00 to 1.50, more preferably 1.00 to 1.30, and most preferably 1.00 to 1.20. Average particle diameter and PSD polydispersity across these ranges can be achieved through selection of reaction conditions, through classification of the particles, or some combination of both methods, all according to methods well known in the art of suspension polymerization. The surface area of the directly polymerized EPOP is typically 10 $m^2$/gram to 1,000 $m^2$/gram, based on weight of directly polymerized EPOP particle (as measured by the BET Nitrogen absorption method supra), preferably 50 $m^2$/g to 1,000 $m^2$/g, more preferably 100 $m^2$/g to 800 $m^2$/gram, and most preferably 200 $m^2$/g to 800 $m^2$/gram. The sizes of the pores of the EPOP are typically 0.005 microns to 10 microns, preferably 0.01 μm to 2.00 μm, more preferably 0.02 μm to 1.00 μm, and most preferably 0.02 μm to 0.5 μm. The EPOPs typically have a pore volume of 0.10 cc/g to 10 cc/gram, based on the weight of EPOP, preferably 0.30 cc/g to 4.0 cc/g, more preferably 0.50 cc/g to 3.0 cc/g, and most preferably 1.00 cc/g to 2.50 cc/g. The volume percent of total pore volume of the EPOP deriving from pores of size less than 0.050 microns is typically 20 vol % to 95 vol %, preferably 30% to 80%, more preferably 40% to 70%, and most preferably greater than 50% to 60%.

The amount of porosity, the pore diameter and surface area of both OPOP precursor particles and directly polymerized EPOP particles can be controlled by varying the amount and type of porogen used during suspension polymerization as disclosed in publications of Meitzner, et. al., such as those related to U.S. Pat. No. 4,382,124, the contents of which are usefully employed in accordance with the invention.

Typical EPOPs polymerized from monomer mixtures containing at least one epoxy functional monomer, i.e., "directly polymerized EPOPs", which are useful in the present invention are polymerized from at least on monoethylenically unsaturated epoxy functional monomer, at least one multi-ethylenically unsaturated monomer, and, optionally, one or more monoethylenically unsaturated non-epoxy monomer. The monoethylenically unsaturated epoxy functional monomer is typically present as polymerized units in the resulting EPOP at a concentration of 1 weight % to 90 weight %, preferably 1 wt % to 80 wt %, more preferably 2 wt % to 50 wt %, and most preferably 2 wt % to 40 wt %, based on the weight of the EPOP. The multi-ethylenically unsaturated monomer is typically present as polymerized units in the resulting EPOP at a concentration of 10 weight % to 99 weight %, preferably 20 wt % to 99 wt %, more preferably greater than 50 wt % to 98 wt %, and most preferably greater than 60 wt % to 98 wt %, based on the weight of the EPOP. The monoethylenically unsaturated non-epoxy monomer is typically present as polymerized units in the resulting EPOP at a concentration of 0 weight % to 89 weight %, preferably 0 wt % to 79 wt %, more preferably 0 wt % to 48 wt %, and most preferably greater than 0 wt % to 38 wt %, based on the weight of the EPOP. The monoethylenically unsaturated non-epoxy monomer may be any of the vinylaromatic monomers and non-aromatic vinyl monomers listed herein above as suitable for preparation of OPOP precursors.

Multi-ethylenically unsaturated monomers useful in preparing the directly polymerized EPOPs of the present invention include divinylbenzene, trivinylbenzene, divinyltoluene, divinylketone, diallyl phthalate, diallyl maleate, N,N'-methylene. bisacrylamide, ethyleneglycol dimethacrylate and polyethyleneglycol dimethacrylate, butadiene, diethyleneglycol divinyl ether, and mixtures thereof.

Suspending agents useful in stabilizing aqueous suspensions before, during, and after the suspension polymerizations to form the OPOP precursors and the directly polymerized EPOPs of the present invention, as well as the EPOPs formed by epoxidation of OPOP precursors, are also well known in the art. Suspending agents are typically water soluble polymers including, for example, polyvinyl alcohol, poly(N-vinylpyrrolidone), carboxymethylcellulose, gelatin, hydroxyethylcellulose, partially saponified polyvinyl acetate, polyacrylamide, polyethylene oxide, polyethyleneimine, polyvinylalkyl ethers, polyacrylic acid copolymers of polyacrylic acid, and polyethylene glycol.

An alternative method for preparing OPOP precursors, and EPOPs derived directly from epoxy monomers, having particle sizes in the range 50–1000 nanometers is based on aqueous emulsion polymerization. Polymers thus prepared are usually stabilized by adding anionic, nonionic, cationic, or amphoteric surfactants, or by the incorporation of anionic or cationic moieties into the polymer itself during synthesis. The emulsion polymerization can be carried out by a number of processes such as those described in Blackley, D. C. Emulsion Polymerisation; Applied Science Publishers: London, 1975; Odian, G. Principles of Polymerization; John Wiley & Sons: New York, 1991; Emulsion Polymerization of Acrylic Monomers; Rohm and Haas, 1967. Any of the ethylenically unsaturated monomers useful for preparation of OPOP precursors by aqueous suspension polymerization (supra) may be usefully employed to prepare OPOP precursors by aqueous emulsion polymerization. Any of the ethylenically unsaturated monomers useful for preparation of EPOPs from monomer mixtures including epoxy functional monomers by aqueous suspension polymerization (supra) may be usefully employed to prepare EPOPs from monomer mixtures including epoxy functional monomers by aqueous emulsion polymerization.

Surfactants useful in stabilizing aqueous emulsions before, during, and after the emulsion polymerizations to form the OPOP precursors and the directly polymerized EPOPs of the present invention, as well as the EPOPs formed by epoxidation of OPOP precursors, are also well known in the art. These useful surfactants may be found in, for example, Porter, M. R., Handbook of Surfactants, Chapman and Hall, New York, 1991. Examples of useful surfactants for the present invention include ionic surfactants such as, for example, sodium lauryl sulfate, dioctylsulfosuccinate, sodium polyoxyethylene lauryl ether sulfate, sodium dodecyl benzenesulfonate; and non-ionic surfactants such as, for example, glycerol aliphatic esters, polyoxyethylene aliphatic esters, polyoxyethylene alcohol ethers; and stearic acid monoglyceride. Amphoteric surfactants may also be useful. Amphoteric surfactants bear both acidic and basic functionality and are well known in the art (see, for example, Amphoteric Surfactants, ed. B. R. Bluestein and C. L. Hilton, Surfactant Series Vol. 12 Marcel Dekker NY, N.Y.(1982)). Fluorinated surfactants such as perfluoro-octanoic acid and salts thereof are also useful, particularly for stabilization of fluoropolymers. Silicon surfactants are also useful, especially for stabilizing siloxane polymers. In addition, monomeric surfactants may be incorporated into the polymer chain during polymerization. For example, these monomeric surfactants impart covalently bound surfactant functionality to polymers: nonylphenoxypropenylpolyethoxylated sulphate, sodium alkyl allyl sulfosuccinate, allyl ammonium lauryl 12 EO phosphate, allyl ammonium linear dodecyl benzene sulfonate, and allyl ammonium lauryl sulfate.

In the method of the present invention, free radical polymerization may preferably be used to prepare the polymer that will become the major component of the polymeric phase of the OPOP precursors and EPOPs. In that case, the polymer is formed by the polymerization of ethylenically unsaturated monomers, and the polymerization is initiated by decomposition of an initiator to form free radicals.

Initiation of free radical polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. These initiators and many other suitable initiators are disclosed in in Blackley, D. C. Emulsion Polymerisation; Applied Science Publishers: London, 1975; Odian, G. Principles of Polymerization; John Wiley & Sons: New York, 1991; Emulsion Polymerization of Acrylic Monomers; Rohm and Haas, 1967. Of particular utility in the aqueous suspension and emulsion polymerizations of the present invention are initiators, usually hydrophobic, that partition to the droplets containing monomer and porogen in preference to the aqueous phase. In this way, the polymerization occurs within the medium containing the porogen with the result that the polymer is formed in intimate contact with the porogen, causing the polymer and porogen to phase separated to form a porous particle.

The monomer mixture from which directly polymerized EPOPs may be polymerized includes at least one monoethylenically unsaturated epoxy functional monomer, at least one multi-ethylenically unsaturated monomer, and, optionally, one or more monoethylenically unsaturated non-epoxy functional monomers. Preferred examples of monoethylenically unsaturated non-epoxy functional monomers include: C1–C22 linear or branched chain alkyl (meth) acrylates, bornyl (meth)acrylate, and isobornyl (meth) acrylate; styrene or substituted styrenes; butadiene; vinyl acetate or other vinyl ester; vinyl chloride; vinylidene chloride; N,N-di(methyl)aminoethyl (meth)acrylate; monomers containing α,β-unsaturated carbonyl functional groups such as fumarate, maleate, cinnamate and crotonate; and (meth) acrylonitrile. Epoxy functional monoethylenically unsaturated monomers useful in the present invention include, for example, glycidyl (meth)acrylate; C4–C20 alkyl (meth) acrylates bearing one or more epoxy groups; aryl (meth) acrylates bearing one or more epoxy groups; allyl glycidyl ether; vinyl epoxides; acyclic epoxy olefins including 1,7-octadiene monoepoxide, and butadiene monoxide; and cyclic epoxyolefins including limonene monoepoxide, and 1,5-cyclooctadiene monoepoxide. Used herein, the word fragment "(meth)acryl" refers to both "methacryl" and "acryl".

Stock solutions of the "olefin polymerization catalyst composition" of the present invention are prepared by combining the catalyst component, the activator component, and the EPOP of the present invention with an anhydrous solvent. The combining of these materials is performed under anhydrous conditions using techniques well known in the art for manipulating air-sensitive materials. For example, the combining can be accomplished by manipulation of the materials in a glovebox under dry Argon atmosphere. Any solvent that can be dried; that does not react with the catalyst component, the activator, component, the EPOP, or any combination thereof; and that can solubilized the catalyst and activator components at useful concentrations may be used as a solvent for the preparation of the catalyst component, and for subsequent use in olefin polymerization. Aromatic hydrocarbons, alkyl substituted aromatic hydrocarbons, and C-4 to C-20 alkanes are preferred. In a preferred embodiment of the formation of a stock solution of catalytic component and activator component, the solvent is anhydrous toluene. A catalytic component, for example $(BuCp)_2ZrCl_2$, is combined with 10% MAO solution in toluene. After 15 minutes, the solution turns a pale yellow-orange color. In a preferred embodiment of the preparation of the catalyst composition, a slurry of EPOP in dry toluene is shaken while adding a stock solution of catalytic component and activator component (for example, a solution of $(BuCp)_2ZrCl_2$/MAO in toluene). The EPOP particles become colored (yellow-orange in this example) while solution become clear and colorless or very light in color, indicating that the catalytic component has been absorbed into the EPOP. The toluene is removed under reduced pressure, and replaced with solvent (e.g., dry heptane). The slurry of catalyst composition in solvent is transferred to a pressure reactor which is then pressurized with dry Argon and olefin monomer (see herein below) to begin the olefin polymerization. Although the method of the preferred embodiment just described involves first preparing a solution of the catalytic component and the activator component in a solvent, and adding that solution to a slurry of EPOP particles in a solvent, any order of combination of the catalytic component, the activator component, EPOP, and solvent may be used in the practice of the present invention. Non-limiting examples of methods of combination involving varying order of addition include: a solution of the activator component in solvent can be added to a slurry of the EPOP in solvent, followed by addition a solution of the catalytic component in solvent; a solution of the catalytic component in solvent can be added to a slurry of the EPOP in solvent, followed by addition of a solution of the activator component in solvent; the slurry of EPOP in solvent can be added to a solution of catalytic component, activator component, and solvent; a solution of catalytic component, activator component, and solvent can be added to dry EPOP; a solution of catalytic component in solvent can be added to dry EPOP, followed by addition of a solution of activator component in solvent; or a solution of activator component in solvent can be added to dry EPOP, followed by addition of a solution of catalytic component in solvent. Further methods involving use of either or both catalytic component and activator component can also be practiced in the present invention. Furthermore, multiple solvents may be used. When more than one solvent is used, it is preferred that those solvents are miscible with one another. It is further understood that, in any of the methods of combination enumerated: one or more activator components may be used; one or more catalytic components may be used; and one or more EPOPs may be used.

Ziegler-Natta based catalyst compositions of the present invention for PE, PP, and their copolymers can be made by a variety of methods which will be clear to one skilled the art. The $TiCl_4$/$MgCl_2$ catalyst system is formed within the structure of the EPOP, imposing the commercially-desirable spheroidal morphology on the resulting catalyst. In this way the catalyst composition can be used in any commercial process type (gas phase, bulk monomer, slurry) to manufacture high bulk density, spherical polymer particles.

A typical method for producing the Ziegler-Natta based catalyst composition is to introduce a suitable magnesium precursor into the EPOP particle. Preferably a solution of the magnesium species is used. Suitable Mg precursors include, for example, Grignards, magnesium alkoxides, mixed Mg/Ti alkoxides. The solvent can be removed to afford a magnesium impregnated EPOP particle which is then subjected to a suitable chlorinating agent to afford $MgCl_2$ particles within the EPOP. Suitable chlorinating agents are known to those skilled in the art but include, for example, $TiCl_4$, thionyl chloride, benzoyl chloride. The resulting magnesium impregnated EPOP can then be treated with titanium tetrachloride to produce the catalyst composition. (When $TiCl_4$ is used as the chlorinating agent, treatment with more titanium tetrachloride is optional.) Typically this last step is carried out at temperatures in the range of 80–120° C. and then the resulting catalyst composition is washed with excess aliphatic hydrocarbon (to remove any soluble titanium species that would cause reactor fouling—and in the case of PP atactic PP generation). Catalyst compositions made in the absence of any electron donors are suitable for PE production. Electron donors can be incorporated into the catalyst composition to enhance catalyst activity and, in the case of PP, to enhance stereoselectivity. Suitable electron donors include, THF, aromatic esters such as ethylbenzoate, phthalates such as di-n-butyl phthalate, and diethers. Preferred electron donor families for PP catalysts are aromatic esters such as ethylbenzoate, phthalates such as di-n-butyl phthalate and diethers.

Activator components for all of these catalyst commpositions are preferably trialkylaluminums such as triethyl or triisobutyl aluminum. When used for PP manufacture, the catalysts are typically used in combination with third components (electron donors) to enhance stereoselectivity. In the case of catalysts with aromatic esters as internal donors the preferred third components (or external donors) are also aromatic esters such as para-ethoxy-ethylbenzoate and the like, where phthalates are used as internal donors the preferred external donors are silanes such as dialkyl dialkoxy silanes like dicyclohexyldipropoxy silanes, in the case of the diethers no external donor is strictly essential but optionally the silane donors can be used to further improve stereoselectivity.

The present invention also provides a general process for the production of specific polyolefins by judicious selection of catalytic component, activator component, and EPOP. The process comprises polymerizing olefins such as ethylene or propylene alone or in the presence of higher $\alpha$-olefins, diolefins or cycloolefins in the presence of the catalyst composition. Combinations of the above catalyst components within the catalyst composition have utility in accordance with process of the present invention.

The advantages of the invention are obtained in the ability of the epoxy-based materials to react with commercially important catalytic components for olefin polymerization, the resulting catalyst compositions having utility in the polymerization of a range of olefin monomers. The reaction of the epoxy-based materials with the catalytic components and activator components affords additional advantages, namely, stabilizing, activating and supporting the catalysts.

The present invention is directed to a catalyst composition for the polymerization of olefins formed by reaction of an EPOP, a catalytic component, and an activator component. The catalyst composition has utility in a general catalytic process for polymerization of olefins. In particular, the process of catalytically converting ethylene to higher molecular weight polyethylene homopolymers, such as high density polyethylene (HDPE) and linear low density polyethylene (LLDPE), and copolymers with alpha-olefins such as 1-butene, 1-hexene and 1-octene. These olefin polymers are intended for processing into articles of manufacture by extrusion, injection molding, thermoforming, rotational molding, hot melt processing and related techniques. In addition, the polyolefins of the present invention are homopolymers of ethylene and propylene, copolymers of ethylene and propylene with higher alpha-olefins or diolefins, and stereoregular polymers of propylene.

In accordance with the present invention, polyolefins can be prepared from olefin monomers using a catalyst composition in a catalytic process with olefin monomers such as unbranched aliphatic olefins having from 2 to 12 carbon atoms, branched aliphatic olefins having from 4 to 12 carbon atoms, unbranched and branched aliphatic α-olefins having from 2 to 12 carbon atoms, conjugated olefins having 4 to 12 carbon atoms, aromatic olefins having from 8 to 20 carbons, unbranched and branched cycloolefins having 3 to 12 carbon atoms, unbranched and branched acetylenes having 2 to 12 carbon atoms, and combinations thereof Also in accordance with the invention, olefin monomer further comprises polar olefin monomers having from 2 to 60 carbon atoms and at least one atom such as O, N, B, Al, S, P, Si, F, Cl, Br and combinations thereof.

In particular, the olefin monomer is ethylene, propene, 1-butene, 1-hexene, butadiene, 1,6-hexadiene, styrene, alpha-methylstyrene, cyclopentene, cyclohexene, cyclohexadiene, norbornene, norbornadiene, cyclooctadiene, divinylbenzene, trivinylbenzene, acetylene, diacetylene, alkynylbenzene, dialkynylbenzene, ethylene/1-butene, ethylene/isopropene, ethylene/1-hexene, ethylene/1-octene, ethylene/propene, ethylene/cyclopentene, ethylene/cyclohexene, ethylene/butadiene, ethylene/1,6-hexadiene, ethylene/styrene, ethylene/acetylene, propene/1-butene, propene/styrene, propene/butadiene, propylene/1-hexene, propene/acetylene, ethylene/propene/1-butene, ethylene/propene/1-hexene, ethylene/propene/1-octene, and various combinations thereof.

In one embodiment, the catalyst composition of the present invention can be usefully employed with many catalytic components exhibiting high activities in ethylene homopolymerization and copolymerization of ethylene/higher α-olefins, allowing the synthesis of ethylene homopolymers and copolymers with narrow-molecular weight distributions and/or homogeneous branching distributions. The HDPE and LLDPE resins prepared are intended for use in the production of films with relatively high impact strength and clarity, the fabrication into articles and useful objects by extrusion, injection molding, thermoforming, rotational molding, holt melt processing, the processing of polyethylenes having monodisperse, inorganic particulate additives or modifiers and the processing of coated surfaces, articles and useful objects using polymers comprising ethylene.

An embodiment illustrative of the general utility of the catalyst composition is the production of polyethylene. All three classes of the polyethylene (PE), namely high density polyethylene (HDPE), low density polyethylene (LDPE) and linear low density polyethylene (LLDPE), each class of which requires a different catalyst system currently, can be prepared using the catalyst composition of the present invention. HDPE is a linear, semi-crystalline ethylene homopolymer prepared using Ziegler-Natta and Chromium based polymerization methods. LLDPE is a random copolymer of ethylene and α-olefins (such as 1-butene, 1-hexene or 1-octene) prepared commercially using Ziegler-Natta, Chromium based or metallocene based catalysts. LDPE is a branched ethylene homopolymer prepared commercially using a high temperature and high pressure process. HDPE, LDPE and LLDPE can all be prepared by reacting the catalyst compositions of the present invention with their respective metal based catalytic component.

Another embodiment illustrative of the general utility of the catalyst composition is the production of copolymers of ethylene and higher alpha-olefins. When making polymers, Ziegler-Natta catalysts typically produce polyethylene resins of moderately broad to very broad molecular weight distribution, as characterized by MWD values greater than 6. The occurrence of broad molecular weight distributions in such catalyst systems is attributed to inhomogeneous catalytic sites. By reacting an EPOP with a Ziegler-Natta catalyst and forming the catalyst composition of the present invention, the polymerization of ethylene can lead to narrower molecular weight distributions, as characterized by MWD values less than 6.

In the process of the present invention, olefins such as ethylene or propylene, either alone or together with higher alpha-olefins having 3 or more carbons atoms, are polymerized in the presence of a catalyst composition, itself formed by combining an EPOP with at least one catalytic component and at least one activator component. In accordance with the present invention, one can also produce olefin copolymers of ethylene and higher alpha-olefins having 3–20 carbon atoms. Comonomer content can be controlled through selection of EPOP, catalytic component, and activator component.

Experimental.

Determination of level of ethylenically unsaturated groups of OPOP precursors and EPOPs. Solid state 13C NMR (nuclear magnetic resonance) was used to characterize and quantify the amount of ethylenically unsaturated groups contained in the OPOP precursors and EPOPs useful in the present invention.

Determination of porosity. The porosities of OPOP precursors and EPOPs described herein by example were measured by Nitrogen adsorption according to methods disclosed by Brunauer, et al., J. Am. Chem Soc. 60, 309 (1938).

Some embodiments of the invention will now be described in detail in the following Examples. The following abbreviations shown in Table 1 are used in the examples.

TABLE 1

Abbreviations

| Abbreviation | Description |
| --- | --- |
| RPM | revolutions per minute |
| D. I. water | deionized water |
| Oxone ™ oxidant | provided as a solid containing 42% active potassium hydrogen persulfate, KHSO$_5$. Nominal molecular weight = 614. Oxone ™ is available through DuPont of Wilmington, Delaware. |
| (BuCp)$_2$ZrCl$_2$ | available from Aldrich Chemical Company, Milwaukee, Wisconsin |
| MAO | methylaluminoxane as a 10 weight % solution in toluene, available from Albemarle Corporation, Baton Rouge, Louisiana |
| DVB | poly(divinylbenzene) at active ingredient concentrations of 55 weight % and 80 weight %, available from Aldrich Chemical Company, Milwaukee, Wisconsin |
| MIBC | methyl isobutyl carbinol, available from Aldrich Chemical Company, Milwaukee, Wisconsin |
| Culminal ™ MHEC-8000 | available from Hercules/Aqualon, Wilmington, Delaware |

TABLE 1-continued

Abbreviations

| Abbreviation | Description |
| --- | --- |
| Unipol ™ catalyst | olefin polymerization catalyst available from Dow Chemical Company, Midland, Michigan |
| Insite ™ catalyst | olefin polymerization catalyst available from DuPont Dow Elastomers, |
| Versipol ™ catalyst | olefin polymerization catalyst available from DuPont, Wilmington, Delaware |

EXAMPLE A

Preparation of an Olefin Functional Porous Organic Polymer Precursor.

This example illustrates the preparation of an olefin functional porous precursor polymer useful for the preparation of the catalyst composition of the present invention.

An aqueous solution was prepared by mixing a first solution of deionized water (300 g), 50% aqueous sodium hydroxide (2.5 g), boric acid (1.7 g), and sodium lauryl sulfate (0.1 g) with a second solution of Culminal™ MHEC-8000 (3.4 g) in deionized water (380 g), and added to a 2-liter 4-necked round bottom flask was equipped with a mechanical stirrer, a condenser, a thermocouple and a nitrogen inlet.

Enough inhibited divinylbenzene (80% purity) was passed down a standard inhibitor removal column (available from Aldrich Chemical Co., Milwaukee, Wis.). to provide at least 90 grams of uninhibited divinylbenzene (80% purity). A monomer mixture was prepared by mixing 90 grams of fresh, uninhibited divinylbenzene (80% purity), 75 grams of o-xylene, 90 grams of methyl isobutyl carbitol (MIBC), and 2.0 grams of azobis(isobutyronitrile) (AIBN). The monomer mixture was then added to the reactor and stirred under a nitrogen atmosphere at 300 RPM for 15 minutes. The stirring rate was maintained at 300 RPM for the rest of the process. The reaction mixture was then heated to 75° C. during one hour, held at 75° C. for a period of 10 hours, and then cooled to room temperature. A single portion of deionized water (500 g) was then added, followed by addition of a cellulose destroying enzyme. This optional treatment gives improved filtration rates.

The reaction mixture was transferred to a filtration column, and the reaction solvents were removed by vacuum filtration. The OPOP precursor particles were washed successively with an additional 2 aliquots of deionized water (500 ml), 3 aliquots of methanol (500 ml), and 3 aliquots of acetone (500 ml). During each wash cycle the particles and the fresh wash solvent were shaken together on the filtration column prior to draining the solvent. The particles were dried overnight on the column under a stream of nitrogen, followed by drying to constant weight in a vacuum oven at 80° C.

Typically, the average particle diameter is 80 microns, the porosity is 1.9 cc/g, the average pore diameter is 104 angstroms and the surface area is 730 m$^2$/g. The amount of pendant vinyl groups, as determined by $^{13}$CNMR was measured to be approximately 1.5 mmol/g, based on the weight of OPOP precursor. A classification step was, optionally, performed using screens of varying size. Table 2 lists laboratory prepared OPOP precursors made according to the method of Example A, and commercial OPOP precursors made according to a method similar to that of Example A.

TABLE 2

OPOP precursor particles prepared by the method of Example A.

| OPOP Precursor Example Number | Lower Screen Size (microns) | Upper Screen Size (microns) | Comment |
| --- | --- | --- | --- |
| A1 | 38 | 45 | prepared by the method of Example A |
| A2 | 38 | 45 | prepared by the method of Example A |
| A3 | not screened | not screened | prepared by a method similar to that of Example A |
| A4 | not screened | not screened | prepared by a method similar to that of Example A; then washed once with methanol |
| A5 | not screened | not screened | prepared by a method similar to that of Example A |

(a) Unscreened OPOP precursors have an average particle diameter = 75 microns; surface area = 700 m2/g; average pore size = 300 Angstroms (30 nanometers).

EXAMPLE B

Preparation of a DVB-Crosslinked Epoxy Functional Porous Organic Polymer Containing Glycidyl Methacrylate as Polymerized Units at the Level of 1.5 mmole/gram of Polymer.

An aqueous solution was prepared by mixing a first solution of deionized water (300 g), 50% aqueous sodium hydroxide (2.0 g), boric acid (3.0 g), and sodium lauryl sulfate (0.1 g) with a second solution of Culminal™ MHEC-8000 (3.4 g) in deionized water (380 g), and added to a 2-liter 4-necked round bottom flask was equipped with a mechanical stirrer, a condenser, a thermocouple and a nitrogen inlet.

A monomer mixture was prepared by mixing 75 grams of divinylbenzene (80% purity), 20.4 grams of glycidyl methacrylate, 75 grams of o-xylene, 90 grams of methyl isobutyl carbitol (MIBC), and 2.0 grams of azobis (isobutyronitrile) (AIBN). The monomer mixture was then added to the reactor and stirred under a nitrogen atmosphere at 300 RPM for 15 minutes. The stirring rate was maintained at 300 RPM for the rest of the process. The reaction mixture was then heated to 75° C. during one hour, held at 75° C. for a period of 10 hours, and then cooled to room temperature. A single portion of deionized water (500 g) was then added.

The reaction mixture was transferred to a filtration column, and the reaction solvents were removed by vacuum filtration. The epoxy functional porous organic polymer particles were washed successively with an additional 2 aliquots of deionized water (500 ml), 3 aliquots of methanol (500 ml), and 3 aliquots of acetone (500 ml). During each wash cycle the particles and the fresh wash solvent were shaken together on the filtration column prior to draining the solvent. The particles were dried overnight on the column under a stream of nitrogen, followed by drying to constant weight in a vacuum oven at 80° C.

EXAMPLE C

Preparation of a DVB-Crosslinked Hydroxy Functional Porous Organic Polymer Containing Hydroxypropyl Methacrylate as Polymerized Units at the Level of 1.5 mmole/gram of Polymer.

An aqueous solution was prepared by mixing a first solution of deionized water (300 g), 50% aqueous sodium hydroxide (2.5 g), boric acid (2.7 g), and sodium lauryl sulfate (0.1 g) with a second solution of Culminal™ MHEC-8000 (3.4 g) in deionized water (380 g), and added to a 2-liter 4-necked round bottom flask was equipped with a mechanical stirrer, a condenser, a thermocouple and a nitrogen inlet. A monomer mixture was prepared by mixing 75 grams of divinylbenzene (80% purity), 20.7 grams of hydroxy propyl methacrylate, 75 grams of o-xylene, 90 grams of methyl isobutyl carbitol (MIBC), and 2.0 grams of azobis(isobutyronitrile) (AIBN). The monomer mixture was then added to the reactor and stirred under a nitrogen atmosphere at 300 RPM for 15 minutes. The stirring rate was maintained at 300 RPM for the rest of the process. The reaction mixture was then heated to 75° C. during one hour, held at 75° C. for a period of 10 hours, and then cooled to room temperature. A single portion of deionized water (500 g) was then added.

The reaction mixture was transferred to a filtration column, and the reaction solvents were removed by vacuum filtration. The hydroxy functional porous organic polymer particles were washed successively with an additional 2 aliquots of deionized water (500 ml), 3 aliquots of methanol (500 ml), and 3 aliquots of acetone (500 ml). During each wash cycle the particles and the fresh wash solvent were shaken together on the filtration column prior to draining the solvent. The particles were dried overnight on the column under a stream of nitrogen, followed by drying to constant weight in a vacuum oven at 80° C.

EXAMPLE D

Epoxidation Process Using Dimethyldioxirane Generated from Oxone™ 2.0 Equivalents/Vinyl Group at 0° C.

A 500 ml 3-necked Ground bottom flask was equipped with a mechanical stirrer (Teflon™ paddle), a nitrogen inlet, a thermometer and a liquid addition port. The flask was charged with 5.0 grams of OPOP precursor prepared in Example A (screened to provide particles having diameters between 38 µm and 45 µm), and 50 grams of HPLC grade acetone. A static blanket of nitrogen was maintained in the headspace of the reactor throughout the reaction period. The reaction mixture was stirred slowly (at about 150 RPM nominal) at room temperature for 1 hour.

At the end of the 1 hour period, a single portion of 4.61 grams of sodium bicarbonate was added to the reaction mixture, followed 1 minute later by 20 grams of D.I. water. The reaction mixture was stirred at room temperature for a further 30 minutes, then cooled to 0° C. using a large ice bath and held at that temperature for 30 minutes.

A solution of 9.21 grams of DuPont Oxone™, (2.0 equivalents/vinyl group of the poly(divinylbenzene) resin, assuming 1.5 mmol vinyl group/gram resin) in 36.86 grams of D.I. water was prepared, providing 46.07 grams of a nominally 20% solution.

This Oxone™ solution was charged to the reactor over a period of approximately 4 hours using a peristaltic pump at a nominal constant flow rate of 0.19 grams/minute while maintaining the temperature at 0° C. An additional portion of sodium bicarbonate (4.61 grams) was charged to the reactor 1 hour after the start of the Oxone™ feed. Following the addition, the reaction mixture was allowed to warm slowly to 10° C. with continued stirring over a period of 20 hours, then allowed to warm to room temperature over a period of 2 hours.

The reaction mixture was then vacuum filtered through Fisher Q8 filter paper, available from Fisher Scientific, Pittsburgh, Pa., and washed with 3 separate 100-gram portions of D.I. water, fully reslurrying the mixture after each liquid addition, followed by 3 separate portions of dry HPLC grade acetone, again reslurrying the mixture. The resin was then dried under a flow of nitrogen gas, followed by drying under vacuum. The weight of epoxidized resin obtained was 5.3 grams. IR analysis of the product resin showed the appearance of a new absorption peak at about 1250 cm-1 (epoxide) without the appearance of corresponding peaks in the range of 3550 cm-1 (O—H).

EXAMPLE E

Epoxidation Process Using Dimethyldioxirane Generated Using Oxone™ 0.5 Equivalents/Vinyl Group at Room Temperature.

A 500 ml 3-necked round bottom flask was equipped with a mechanical stirrer (Teflon™ paddle), a nitrogen inlet, a thermometer and a liquid addition port. The flask was charged with 5.0 grams of OPOP precursor of Example A1, and 30 grams of HPLC grade acetone. A static blanket of nitrogen was maintained in the headspace of the reactor throughout the reaction period. The reaction mixture was stirred slowly (at about 150 RPM nominal) at room temperature for 0.5 hour.

At the end of the 0.5 hour period, a single portion of 2.3 grams of sodium bicarbonate was added to the reaction mixture, followed 1 minute later by 1 grams of D.I. water. The reaction mixture was stirred at room temperature for a further 30 minutes.

A solution of 2.3 grams of DuPont Oxone™, (0.5 equivalents/vinyl group of the poly(divinylbenzene) resin, assuming 1.5 mmol vinyl group/gram resin) in 30 grams of D.I. water was prepared, providing 32.3 grams of a nominally 7.1% solution.

This Oxone™ solution was charged to the reactor over a period of approximately 3 hours using a peristaltic pump at a nominal constant flow rate of 0.18 grams/minute while maintaining the temperature at room temperature. Following the addition, the reaction mixture was held at room temperature for one hour.

The reaction mixture was then vacuum filtered through Fisher Q8 filter paper, available from Fisher Scientific, Pittsburgh, Pa., and washed with 3 separate 100-gram portions of D.I. water, fully reslurrying the mixture after each liquid addition, followed by 3 separate portions of dry HPLC grade acetone, again reslurrying the mixture. The resin was then dried under a flow of nitrogen gas, followed by drying under vacuum. The weight of epoxidized resin obtained was 4.85 grams. IR analysis of the product resin showed the appearance of a new absorption peak at about 1250 cm$^{-1}$ (epoxide), a reduction in the intensity of the vinyl absorption at 1630 cm$^{-1}$, no change in the intensity of the peak in the range of 3550 cm$^{-1}$ as compared to the starting OPOP precursor spectrum.

EXAMPLE F

Epoxidation Process Using m-chloroperbenzoic Acid (MCPBA).

A 500 ml narrow mouth glass bottle was charged with 5.0 grams of OPOP precursor prepared in Example A (screened to provide particles having diameters between 38 µm and 45 µm), and 150 grams of 1,2-dichloroethane. The bottle was placed on a laboratory shaker and agitated gently for 1 hour. The bottle was then removed and placed in an ice bath for 30 minutes. A solution was prepared consisting of 20 ml of 1,2-dichloroethane and m-chloroperoxybenzoic acid (nominal 75% active) in one of the amounts (Fa through Fg) shown in Table 3, depending upon the desired number of mmoles of MCPBA per mmole of vinyl group. This solution was rapidly added to a cold reaction bottle, and the bottle placed on the shaker and agitated gently for 20 hours. During this time the temperature of the reaction mixture rose to 30° C., primarily due to the heat generated by the mechanism of the shaker.

The reaction mixture was poured into a 125 ml glass filter column equipped with a fine porosity filter disk. The reaction solvent was removed under vacuum, and the solid resin was mixed with 100 ml of 1,2-dichloroethane, followed by removal under vacuum. This process was repeated with two additional 100 ml portions of 1,2-dichloroethane. The wash process was repeated with three portions of inhibitor free tetrahydrofuran. The solid resin was then dried in the column under a flow of nitrogen, followed by drying at room temperature under vacuum.

TABLE 3

MCPBA use level based on mmoles of OPOP precursor vinyl groups

| Example number representing MCPBA use level | Grams of MCPBA added | Mmoles MCPBA/ mmole vinyl |
| --- | --- | --- |
| Fa | 0.587 | 0.34 |
| Fb | 0.863 | 0.50 |
| Fc | 1.208 | 0.70 |
| Fd | 1.726 | 1.00 |
| Fe | 2.244 | 1.30 |
| Ff | 2.589 | 1.50 |
| Fg | 3.451 | 2.00 |

EXAMPLE G

Preparation of a Stock Solution of Catalyst Component $(BuCp)_2ZrCl_2$ and Activator Component Methylaluminoxane (MAO) in Toluene.

The manipulations of this example were carried out in a glovebox under dry Argon atmosphere. $(BuCp)_2ZrCl_2$ (~9.5mg) was placed in a 20 ml vial, followed by addition of 3.2 mls of 10% MAO solution in toluene. After 15 minutes, the solution turned a pale yellow-orange color.

EXAMPLE H

Preparation of Catalyst Composition from a Poly (DVB) Olefin Functional Precursor Epoxidized Using Oxone™.

The manipulations of this example were carried out in a glovebox under dry Argon atmosphere. The epoxidized resin of Example D (100 mg) and 2 mls of toluene were charged to a 20 ml vial to form a slurry. While shaking the slurry, 270 μl of $(BuCp)_2ZrCl_2$/MAO stock solution (~20 μmole Zr/g of epoxidized resin) was add to the slurry. After approximately 20 minutes, the resin became yellow-orange while the solution became clear, indicating that the $(BuCp)_2ZrCl$/MAO had been absorbed into the resin. After 30 minutes, the toluene was removed under reduced pressure during approximately one hour to yield a pale yellow powder. The powder (60 mgs) was then suspended in 300 mls of heptane in a 600 ml Parr bomb sleeve. The sleeve was then sealed inside the Parr bomb which was pressurized to ~40 psig with Argon. The Parr bomb was then removed from the glovebox and attached to the ethylene system in preparation for an ethylene polymerization.

EXAMPLE I

Preparation of a Catalyst Composition from a Poly (DVB) OPOP Precursor Expoxidized Using MCPBA.

The manipulations of this example were carried out in a glovebox under dry Argon atmosphere. The EPOP of Example E (100 mg) and 2 mls of tolune were charged to a 20 ml to form a slurry. While shaking the slurry, 270 μl of $(BuCp)_2ZrCl_2$/MAO stock solution (~20 μmole Zr/g of epoxidized resin) was add to the slurry. After approximately 20 minutes, the resin became yellow-orange while the solution became clear, indicating that the $(BuCp)_2ZrCl$/MAO had been absorbed into the resin. After 30 minutes, the toluene was removed under reduced pressure during approximately one hour to yield a pale yellow powder. The powder (60 mgs) was then suspended in 300 mls of heptane in a 600 ml Parr bomb sleeve. The sleeve was then sealed inside the Parr bomb which was pressurized to ~40 psig with Argon. The Parr bomb was then removed from the glovebox and attached to the ethylene system in preparation for an ethylene polymerization.

EXAMPLE J

Standard Ethylene Olymerization Procedure for Evaluating Catalyst Compositions in a 600 ml Parr Reactor.

This procedure was used in all of the olefin polymerization examples described herein below. A 600 ml Parr reactor, including its inner glass sleeve, was dried overnight in an oven at ~110° C., and then placed in a glovebox having an atmosphere of dry Argon. A pre-weighed quantity of catalyst composition, (typically ~60 mg) was charged to the reactor sleeve, and then 300 ml of dry, oxygen-free heptane was added to the sleeve as a diluent. The reactor was assembled and sealed, pressurized to 40 psig with Argon, and then removed from the dry box. The reactor was then placed in a pre-heated heating mantle, and connected to an ethylene feed line by means of a Swagelok quick-connect fitting. The connection was immediately pressure purged ten times to 85 psig with ethylene. The stirring shaft was then connected to the drive and stirring was commenced at about 200 rpm. While the reactor was warming to the target polymerization temperature, the water supply and discharge lines were connected to the cooling coil. Once the reactor was at the target polymerization temperature, the Argon pressure was vented through the ethylene connection through a 3-way valve with a check-protected vent. The reactor was then pressurized to 85 psig with ethylene, and maintained at that pressure by means of a pressure regulator on the ethylene supply. The ethylene feed was measured by a thermal flowmeter connected to a data acquisition computer. Temperature was maintained within 3° C. of the target temperature by adjusting cooling water flow through the cooling coil. At the end of the desired polymerization batch time, ethylene flow was stopped, and the reactor was vented to atmospheric pressure. The reactor was then disassembled, and the product collected on a paper filter and washed with about 100 cc of methanol. The washed polyethylene product was dried on the filter, followed by drying to constant weight in a vacuum oven at 80° C.

EXAMPLE K

Evaluation of Catalyst Composition Made From p-DVB Epoxidized Using MCPBA.

Catalyst compositions (63 mg) made by the method of Example I was evaluated using the method of Example J.

The polyethylene particles (27.8 g) produced displayed good morphology, characterized as spherical particles replicating the original shape of the epoxy functionalized porous organic polymer, a low level of fines, and good bulk density (0.340 grams per cc of polyethylene particles). There was no reactor fouling, indicating no leaching of the catalyst into the solution phase. This evaluation shows that catalyst compositions based on p-DVB resin epoxidized with MCPBA are highly active catalysts for olefin polymerization.

EXAMPLE L

Preparation and Fluid Bed Drying of Catalytic Component $(n\text{-}BuCp)_2ZrCl_2$.

All manipulations involved in this preparation and drying of the catalyst composition were performed in a glovebox maintained under an atmosphere of dry argon. Catalytic component $(n\text{-}BuCp)_2ZrCl_2$ (10 mg) was weighed into a small vial and 1.0 ml of 30% MAO solution and 0.5 ml of toluene were added. The resultant reaction mixture was allowed to react for an interval of 15 minutes, during which the color of the solution became pale yellow-orange color.

OPOP precursor, Example A4, was placed on a small fritted glass filter funnel equipped with a flexible tube for introduction of dry argon gas. The flexible tube was connected to the outlet tube of the funnel so that the argon would flow upward across the frit to the side containing the OPOP precursor. A steady stream of dry argon was introduced, the $(BuCp)_2ZrCl_2$/MAO solution was added slowly, and mixing was continued for 30 minutes, after which the light yellow catalyst composition was recovered for use.

TABLE 4

Epoxidation of OPOP precursor

| Example #, Epoxidation[a] | Example #, OPOP precursor[b] | Oxidant | Oxidant Equivalents/ vinyl[c] |
|---|---|---|---|
| E1 | A5 | Oxone ™ | 0.50 |
| E2 | A1 | Oxone ™ | 1.00 |
| D1 | A2 | Oxone ™ | 2.00 |
| D2 | A2 | Oxone ™ | 2.00 |
| D3 | A3 | Oxone ™ | 2.00 |
| D4 | A5 | Oxone ™ | 2.00 |
| D5 | A2 | Oxone ™ | 2.00 |
| D6 | A2 | Oxone ™ | 2.00 |
| F1 | A1 | MCPBA | 0.34 |
| F2 | A5 | MCPBA | 0.50 |
| F3 | A5 | MCPBA | 0.50 |
| F4 | A1 | MCPBA | 0.70 |
| F5 | A1 | MCPBA | 0.70 |
| F6 | A1 | MCPBA | 1.00 |
| F7 | A4 | MCPBA | 1.00 |
| F8 | A1 | MCPBA | 1.30 |
| F9 | A1 | MCPBA | 1.30 |
| F10 | A1 | MCPBA | 1.50 |
| F11 | A5 | MCPBA | 2.00 |
| F12 | A1 | MCPBA | 2.00 |
| F13 | A3 | MCPBA | 2.00 |

[a]Example Numbers beginning with D, E, and F refer to epoxidation reactions carried out according to the preparative examples D, E, and F, respectively. Where the oxidant equivalents per vinyl group of the OPOP precursor differed from that of the general preparative example, appropriate adjustments in the weight of the oxidant were made.
[b]Samples A1 and A2 were prepared by the method of Example A; Samples A3, A4, and A5 were prepared by larger scale preparations using the general method of Example A.
[c]Sample A4 was washed once with methanol prior to epoxidation.

TABLE 5

Catalyst formation and use in ethylene polymerization to produce polyethylene (PE).

| Ex. #, Cat.[a] | Ex. #, epox.[b] | Ox.[c] type | Ox.[c] Level | Ex. #, Polym.[d] | Polymer formed (grams) | Reactor Fouling | grams PE/ mmole Zr-Hr[f] |
|---|---|---|---|---|---|---|---|
| H1 | E1 | Oxone ™ | 0.50 | S1 | 26.6 | NF[e] | 2217 |
| H2 | E2 | Oxone ™ | 1.00 | S2 | 25.5 | NF | 2125 |
| H3 | D1 | Oxone ™ | 2.00 | S3 | 22.7 | NF | 1892 |
| H4 | D2 | Oxone ™ | 2.00 | S4 | 21.3 | NF | 1775 |
| H5 | D3 | Oxone ™ | 2.00 | S5 | 20.5 | NF | 1708 |
| H6 | D4 | Oxone ™ | 2.00 | S6 | 16.2 | NF | 1350 |
| H7 | D5 | Oxone ™ | 2.00 | S7 | 19.9 | NF | 1658 |
| H8 | D6 | Oxone ™ | 2.00 | S8 | 14.6 | NF | 1217 |
| I1 | F1 | MCPBA | 0.34 | S9 | 24.7 | NF | 2058 |
| I2 | F2 | MCPBA | 0.50 | S10 | 12.0 | NF | 1000 |
| I3 | F3 | MCPBA | 0.50 | S11 | 11.9 | NF | 992 |
| I4 | F4 | MCPBA | 0.70 | S12 | 25.1 | NF | 2092 |
| I5 | F5 | MCPBA | 0.70 | S13 | 26.3 | NF | 2192 |
| I6 | F6 | MCPBA | 1.00 | S14 | 20.2 | NF | 1683 |
| I7 | F7 | MCPBA | 1.00 | S15 | 14.9 | NF | 1242 |
| I8 | F8 | MCPBA | 1.30 | S16 | 24.6 | NF | 2050 |
| I9 | F9 | MCPBA | 1.30 | S17 | 24.4 | NF | 2033 |
| I10 | F10 | MCPBA | 1.50 | S18 | 20.2 | NF | 1683 |
| I11 | F11 | MCPBA | 2.00 | S19 | 15.2 | NF | 1267 |
| I12 | F12 | MCPBA | 2.00 | S20 | 23.9 | NF | 1992 |
| I13 | F13 | MCPBA | 2.00 | S21 | 13.8 | NF | 1150 |
| Comparative X | A4 | no epoxidation | — | Comparative SX | 7.9 | Fouled[g] | 658 |

TABLE 5-continued

Catalyst formation and use in ethylene polymerization to produce polyethylene (PE).

| Ex. #, Cat.[a] | Ex. #, epox.[b] | Ox.[c] type | Ox.[c] Level | Ex. #, Polym.[d] | Polymer formed (grams) | Reactor Fouling | grams PE/mmole Zr-Hr[f] |
|---|---|---|---|---|---|---|---|
| Comparative Y | A4 | no expoxidation | — | Comparative SY | 0.0 | Fouled[h] | — |

[a]Example Numbers for catalytic compositions ("cats.") beginning with H designate that EPOPs derived from epoxidation with Oxone ™ were loaded with (BuCp)$_2$ZrCl$_2$/MAO according to the procedure of Example H. Example Numbers beginning with I designate that EPOPs derived from epoxidation with MCPBA were loaded with (BuCp)$_2$ZrCl$_2$/MAO according to the procedure of Example I. Comparative Example X was prepared according to the method of Example I. Comparative Example Y was prepared according to the method of Example L.
[b]Example Numbers beginning with D, E, and F refer to epoxidation reactions carried out according to the preparative examples D, E, and F, respectively. Where the oxidant equivalents per vinyl group of the OPOP precursor differed from that of the general preparative example, appropriate adjustments in the weight of the oxidant were made.
[c]"Ox." is an abbreviation for oxidant.
[d]The Example Numbers for the olefin polymerizations begin with S, designating that these polymerization were carried out according to the method of Example S.
[e]"NF" means that no fouling of internal reactor surfaces observed.
[f]The activity of the catalyst composition is given as grams PE/mmole Zr-Hr (grams of polyethylene produced per millimole of zirconium per hour).
[g]There was heavy fouling of the reactor surfaces resulting from the olefin polymerization of Comparative Example SX.
[h]There was very heavy fouling of the reactor surfaces resulting from the olefin polymerization of Comparative Example SY. No granular polymer could be recovered.

The results displayed in Table 5 indicate that the epoxy functional porous organic polymer, catalytic component, and activator component of the present invention can be combined to produce the catalyst composition of the present invention having high activity during catalysis of olefin polymerization. Further, this high activity is achieved without fouling of the reactor. This lack of fouling indicates that the catalyst component is effectively adsorbed upon the surface of the EPOP, assuring that the locus of olefin polymerization is the catalyst composition particle and not the surrounding solvent medium. Were there any significant level catalytic component in that surrounding medium, unacceptably small particles of polyolefin (here polyethylene) would have formed, fouling the reactor.

In contrast, Comparatives Examples X and Y, both OPOP precursors, were active, but ineffective at suppressing fouling of the reactor. Comparative Example X was prepared from OPOP precursor A4 by the method of Example I. Although granular particles of polyethylene were produced, heavy fouling was observed. Comparative Example Y was prepared from OPOP precursor A4 by the method of Example L which included combining the OPOP precursor with catalytic component and activator component in a fluid bed environment, rather than as a suspension in toluene. No granular particles of polyethylene were produced, and very heavy fouling was observed. The contrast between the EPOP based catalyst compositions of Table 5 and the Comparative based upon OPOP precursor clearly indicates that the epoxy groups are highly efficient at interacting with and reacting with the catalyst component/activator system, causing strong adherence of those components to the surface of the EPOP based catalyst composition. The OPOP precursor, its pendant vinyl groups, and any other adventitious reactive moieties that may be present at low levels on the OPOP precursor are ineffective at preventing fouling.

We claim:

1. An olefin polymerization catalyst composition, wherein said catalyst composition comprises:

(a) at least one catalytic component;
(b) at least one activator component; and
(c) at least one epoxy functional porous organic polymer, wherein said epoxy polymer comprises a plurality of epoxy groups covalently bound to said epoxy polymer.

2. The catalyst composition of claim 1, wherein:

(a) said catalytic component is an organometallic catalyst based on a metal, wherein said metal is a metal selected from the group consisting of metals of Group 3–11, lanthanide metals, actinide metals and combinations thereof; and
(b) said activator component is an activator selected from the group consisting of organoaluminum compounds, organoaluminoxane compounds, hydroxyaluminoxanes, aluminoxinates, organic borane compounds, inorganic borane compounds, borate anions, and mixtures thereof.

3. The catalyst composition of claim 1, wherein said epoxy functional porous organic polymer is prepared by a process comprising:

(a) epoxidizing an olefin functional porous organic polymer precursor to produce said epoxy polymer; and,
(b) optionally, isolating said epoxy polymer.

4. The composition of claim 3 wherein said olefin functional porous organic polymer precursor is prepared by a process comprising:

(a) forming a monomer mixture comprising at least one multi-ethylenically unsaturated monomer and at least one porogen;
(b) polymerizing said multi-ethylenically unsaturated monomer in the presence of said porogen; and,
(c) optionally, isolating said precursor.

5. The catalyst composition of claim 1, wherein said epoxy functional porous organic polymer is prepared by a process comprising:

(a) forming a monomer mixture comprising at least one epoxy functional monomer, at least one multi-ethylenically unsaturated monomer, and at least one porogen;

(b) copolymerizing said epoxy functional monomer with said multi-ethylenically unsaturated monomer to produce said epoxy polymer; and, (c) optionally, isolating said epoxy polymer.

6. The catalyst composition of claim 1, wherein:

(a) said epoxy functional porous organic polymer has a total pore volume of 0.10 cc/g to 9.00 cc/g, as measured by BET Nitrogen absorption in cubic centimeters of pore volume per gram of said epoxy polymer, for all pores having a diameter of 0.005 microns to 10 microns; and (b) said epoxy functional porous organic polymer is in particulate form as a plurality of particles, said particles having an average particle diameter of 0.05 micron to 1,000 microns.

7. A process of making an olefin polymerization catalyst composition, said process comprising:

(a) combining:
   (i) at least one epoxy functional porous organic polymer;
   (ii) at least one catalytic component; and
   (iii) at least one activator;

(b) allowing said epoxy polymer, said catalytic component, and said activator component to react; and, (c) optionally, isolating said catalyst composition.

8. The process of claim 7, wherein said epoxy functional porous organic polymer is prepared by a process comprising:

(a) epoxidizing an olefin functional porous organic polymer precursor to produce said epoxy polymer; and, (b) optionally, isolating said epoxy polymer.

9. The process of claim 7, wherein said epoxy functional porous organic polymer is prepared by a process comprising:

(a) forming a monomer mixture comprising at least one epoxy functional monomer, at least one multi-ethylenically unsaturated monomer, and at least one porogen;

(b) copolymerizing said epoxy functional monomer with said multi-ethylenically unsaturated monomer in the presence of said porogen; and, (c) optionally, isolating said catalyst composition.

10. An olefin polymerization process, wherein said olefin polymerization process comprises:

(a) contacting at least one olefin monomer with at least one olefin polymerization catalyst composition;

(b) polymerizing said olefin monomer to produce a polyolefin;

(c) isolating said polyolefin, wherein said catalyst composition comprises:
   (i) at least one catalytic component;
   (ii) at least one activator component; and
   (iii) at least one epoxy functional porous organic polymer,
   wherein said epoxy polymer comprises a plurality of epoxy groups covalently bound to said epoxy polymer.

* * * * *